(12) United States Patent
Weiss

(10) Patent No.: US 7,228,743 B2
(45) Date of Patent: Jun. 12, 2007

(54) LIGHT POWERED PRESSURE GAUGE

(75) Inventor: John W. Weiss, Oakdale, NY (US)

(73) Assignee: Weiss Instruments, Inc., Holtsville, NY (US)

( * ) Notice: Subject to any disclaimer, the term of this patent is extended or adjusted under 35 U.S.C. 154(b) by 0 days.

(21) Appl. No.: 11/314,809

(22) Filed: Dec. 21, 2005

(65) Prior Publication Data

US 2006/0144159 A1    Jul. 6, 2006

Related U.S. Application Data

(60) Provisional application No. 60/753,381, filed on Dec. 21, 2005, provisional application No. 60/638,301, filed on Dec. 22, 2004.

(51) Int. Cl.
*G01L 7/04* (2006.01)
(52) U.S. Cl. ...................................................... 73/732
(58) Field of Classification Search ................ 73/718, 73/724, 732, 733
See application file for complete search history.

(56) References Cited

U.S. PATENT DOCUMENTS

| | | | | |
|---|---|---|---|---|
| 3,859,575 A | | 1/1975 | Lee et al. ................... 317/246 |
| 4,577,509 A | * | 3/1986 | Moser ......................... 73/658 |
| 4,873,870 A | * | 10/1989 | Delatorre ...................... 73/733 |
| 5,142,913 A | * | 9/1992 | Delatorre ...................... 73/704 |
| 5,196,781 A | | 3/1993 | Jamieson et al. ............. 320/61 |
| 5,230,250 A | | 7/1993 | Delatorre ...................... 73/733 |
| 5,317,918 A | | 6/1994 | Lew ............................ 73/718 |
| 5,363,703 A | * | 11/1994 | Delatorre ...................... 73/733 |
| 5,542,300 A | | 8/1996 | Lee ............................. 73/724 |
| 6,425,741 B1 | * | 7/2002 | Mera et al. ............... 417/222.2 |
| 6,595,006 B2 | * | 7/2003 | Thiesen et al. .................. 62/6 |
| 6,802,243 B2 | * | 10/2004 | Matsuda et al. ............. 92/12.2 |

\* cited by examiner

*Primary Examiner*—Max Noor
(74) *Attorney, Agent, or Firm*—Gerald T. Bodner

(57) ABSTRACT

An extremely low power transducer for use with a meter is able to be powered by miniature solar cells to measure and display a physical quantity such as pressure, force, level or distance. The transducer provides a variable capacitance to an electronic circuit that includes an integrated circuit for conversion to the displayed value.

48 Claims, 13 Drawing Sheets

FIG. 5A

| PSI |
|---|
| 0.00 |

| PSI |
|---|
| 0.25 |

| PSI |
|---|
| 0.50 |

| PSI |
|---|
| 0.75 | o
o
o

| PSI |
|---|
| 49.25 |

| PSI |
|---|
| 49.50 |

| PSI |
|---|
| 49.75 |

| PSI |
|---|
| 50.00 |

LIGHT POWERED PRESSURE GAUGE

CROSS REFERENCE TO RELATED APPLICATIONS

This application is related to U.S. provisional patent application Ser. No. 60/638,301, filed on Dec. 22, 2004, and entitled "Light Powered Pressure Gauge", to U.S. provisional patent application Ser. No. 60/753,381, filed on Dec. 21, 2005, and entitled "Capacitance Measuring Circuit", the disclosure of each of which is incorporated herein by reference. This application claims the benefit of priority under 35 U.S.C. §119 to the aforementioned related provisional applications.

BACKGROUND OF THE INVENTION

1. Field of the Invention

This invention pertains to measuring instruments, and more particularly relates to digital pressure gauges and solar powered devices.

2. Description of the Prior Art

The most familiar use of solar powered devices is the solar calculator. Calculators have a "clear" button that clears and zeros the display, should the display not start at zero. The user interacts with a keyboard to input values and start operations. An LCD (liquid crystal display) displays the resulting number. The first device that operated independent of a user intervention is disclosed by Jamieson, in U.S. Pat. No. 5,196,281, the disclosure of which is incorporated herein by reference. Jamieson describes a digital thermometer with a thermo-resistive sensor powered entirely by solar power capable of turning on and turning off with the available light. While solar powered calculators, watches, and thermometers are in common use today, the application to the measurement of pressure has remained elusive. Pressure sensors that exhibit a capacitance change with pressure offer the best advantage for low power operation that is necessary for solar powered devices where only a few microwatts are available for power.

Lee, in U.S. Pat. No. 3,859,575, the disclosure of which is incorporated herein by reference, describes a capacitive sensor for a pressure transducer. The construction attempts to minimize the changes in capacitance at zero pressure due to differential thermal expansion. A few years later, Lee described a "Center-Mounted Capacitive Pressure Sensor" in U.S. Pat. No. 5,542,300, the disclosure of which is incorporated herein by reference, wherein is described a method to adjust for the ambient temperature effect due to differential thermal expansion. Since with this design the travel is small, it is most important to maximize the dimensional stability. To provide higher pressure ranges, the deformable section, the diaphragm, is made stiffer by increasing the thickness. Capacitive pressure sensors are widely used as the sensor in digital oscilliometric blood pressure monitors as they offer low power and low cost. Capacitive sensors for measuring force are in common use with bathroom scales. Two such scales are known to this inventor that also employ solar cells for power: Model 1610 made by Tanita Corporation of Tokyo, Japan and Model 8100 made by Taylor Precision Products LP of Oak Brook, Ill. The blood pressure monitors and the scales both use an auto-zero routine before the measurement is made to offset the sensor capacitance change with environmental conditions such as temperature and humidity. In the case of the bathroom scale, the auto-zero also compensates for the error due to light level conditions, assuming that the light is consistent before and during the measurement cycle. Lew, in U.S. Pat. No. 5,317,918 and Delatorre in U.S. Pat. No. 5,230,250, the disclosures of which are incorporated herein by reference, describe sensors which use the force from diaphragms, bellows or Bourdon tubes to pull or torque separate capacitive elements to change the gap and effect the capacitance. In all of these cases, two flat plate electrodes face each other separated by a small gap forming a basic capacitor. As the two plates separate, the capacitance diminishes according to the inverse relation of the distance between the plates. This basic geometric arrangement defines the limitations of the approach thus far. The distance relation between the electrode pairs in a capacitive sensor is the focus of the present invention that takes advantage of the large free motion of Bourdon tubes.

Pressure gauges are subject to a variety of environmental conditions, such as ambient temperature, humidity and varying light levels. As with the thermometer, previously referred to, the pressure is most likely not at zero when the gauge is powered on. Advantages from having auto-zeroing cannot be realized. Since many pressure gauges are mounted to pipelines, tanks or tubing in close proximity to pumps and equipment, they are subjected to vibration and pulsation. A common practice is to liquid-fill a gauge with glycerin or silicone oil to dampen the movement and steady the pointer so that a reading can be made even when the gauge is shaking. Pressure gauges that have a sealed case to keep out the elements, or that are liquid filled, will often exhibit an error due to temperature changes that cause the case pressure to change; case compensators such as flexible diaphragms or bladders are used to reduce these effects.

With the globalization of all markets, it has become common for pressure instruments to have multiple scales (for example: PSI, Bar, $kg/cm^2$, KPa). Standardization has not been effective in pressure measurement throughout the world. Mechanical gauges often have scales of concentric arcs, sometimes with 2, 3, or 5 scales, and as such, the readability of the inner scales becomes poor. Electronic pressure instruments have an advantage of being capable of selecting a variety of units of measure. The control integrated circuit "IC" is programmed to calculate the conversion from one unit to another.

Refrigeration gauges, for example, are used for servicing and filling systems. They all have multiple scales, each corresponding to the vapor temperature/pressure relation of a particular refrigerant. The concern over CFCs (chlorofluorocarbons) and their effect on the environment has propelled the development of many new refrigerants. The refrigeration gauge indicates the vapor temperature that corresponds to the vapor pressure of the particular refrigerant, either in degrees F. or degrees C., in a logarithmic, nonlinear, expanding scale resolution. A typical refrigeration gauge would have a scale resolution several times smaller at the top of the scale than at the bottom of the scale. At zero degrees F., the scale increments may be five degrees, and at 100 degrees F., only one degree as shown by the minor divisions in the scale arc. With so many new refrigerants, it is difficult to keep refrigeration gauge scales current. An electronic gauge has the advantage to be able to select multiple scales. Conventional pressure gauges can also select the scale or unit of measure and "dial in" to display the reading in $lb/in^2$, $Kg/cm^2$, Bar's, mmHg, inHg or KPa.

The state of the art thus far for the electronic pressure gauge is limited to external power sources or battery power. Battery powered gauges often have an auto-off feature to save battery life. This necessitates user interaction to turn the gauge on; traditionally, this is not familiar to the user who is accustomed to just observing the pointer position on a mechanical gauge. A light powered pressure gauge that can operate in low levels of light can have the readability and versatility of a digital gauge and has the benefit of always appearing on without the need for user intervention.

The requirements of a solar powered pressure gauge are rigorous, especially considering the requirements of low power, wide range of light conditions, high accuracy, environmental compatibility, ambient temperature effects, over pressure capability and the vast variety of sizes and pressure ranges that need to be offered.

OBJECTS AND SUMMARY OF THE INVENTION

It is an object of this invention to provide a sensor for a very low powered meter that is capable of being self powered by small solar cells in low light conditions without the aid of user interaction.

It is another object of the invention to attach the sensor to a variety of Bourdon tubes or elastic elements and adapt the sensor to any pressure range.

It is a further object of the invention to include the low power capacitive sensor in an extremely low power circuit that includes an integrated circuit with programmable memory capable of characterizing the output as a means of calibration.

It is yet a further object of the invention to provide a sensor for a low powered meter that is self-compensating for both zero and span errors due to ambient temperature changes.

It is another object of the invention to have a low power capacitive sensor for a light powered pressure gauge that is purely elastic with no friction.

A variable capacitance cell that includes a piston and cylinder in a close clearance arrangement characterizes the first embodiment of this invention. A shaft attached to the piston is supported by electrically isolated cylinder cap end bearings. The internal profile of the cylinder includes an internal diameter step to change the gap between the piston and cylinder as the piston is translated axially within the cylinder and thus provides a predictable and linear capacitance relative to the exact piston position. The piston position is determined by the free travel of the Bourdon tube tip. The variable capacitor cell includes attachments to an elastic member such as a Bourdon tube. The displacement of the piston within the capacitive cell is a result of the pressure applied to the Bourdon tube. The transducer is a module that can be attached to a variety of elastic elements.

In a second preferred embodiment, an electrode is attached directly to the Bourdon tube and is concentric with a second fixed electrode. A small gap between the two electrodes forms the variable capacitive sensor, the gap widens as the unconstrained Bourdon tube extends outwardly with increasing internal pressure, resulting in a decreasing capacitance with increasing pressure.

More specifically, the various embodiments of the invention are described below. A variable capacitive sensor formed in accordance with one form of the present invention includes an outer shell defining a first electrode of the capacitive sensor, the outer shell having an axial bore formed therethrough, and having at least a first open axial end in fluid communication with the axial bore; at least a first piston reciprocatingly axially movable within the bore of the outer shell, the at least first piston defining a second electrode of the capacitive sensor; at least a first piston shaft, the at least first piston shaft being connected to the at least first piston; and at least a first end cap bearing, the at least first end cap bearing being mounted on the outer shell at the at least first open axial end thereof; the at least first end cap bearing having a shaft opening formed through the thickness thereof, the at least first piston shaft being received by and reciprocatingly slidably moveable in the shaft opening.

The outer shell preferably includes an inner wall defining the axial bore, the at least first piston preferably includes an outer radial surface, and the outer radial surface of the at least first piston preferably is spaced from the inner wall of the outer shell by a predetermined distance. The outer shell is preferably cylindrical in overall shape.

Preferably, the outer shell includes a first axial portion having a first inner diameter defined by the inner wall, and at least a second axial portion having a second diameter defined by the inner wall and being situated axially adjacent to the first axial portion. The first diameter is preferably different from the second diameter, and the at least first piston is reciprocatingly moveable within the axial bore over the first portion and the at least second portion of the outer shell.

The at least first piston preferably includes opposite axial faces. At least one of the opposite axial faces preferably has formed therein a cutout portion. The at least first end cap bearing preferably has a fluid vent opening formed through the thickness thereof, the fluid vent opening being in fluid communication with the axial bore of the outer shell. There is at least one pivot pin which is disposed on and extending outwardly from the outer shell.

The outer shell preferably includes a second open axial end opposite the at least first open axial end, the second open axial end being in fluid communication with the axial bore. The sensor further preferably includes a second end cap bearing, the second end cap bearing being mounted on the outer shell at the second open axial end thereof, the second end cap bearing having a shaft opening formed through the thickness thereof, the at least first piston shaft being received by and reciprocatingly slidably moveable in the shaft opening of the second end cap bearing.

The at least first piston shaft preferably includes a proximal end situated near the at least first end cap bearing and a distal end situated opposite the proximal end and near the second end cap bearing. The sensor further preferably includes a bumper situated on the distal end of the at least first piston shaft and engageable with the second end cap bearing.

The sensor further preferably includes an end cap, the end cap being situated on the proximal end of the at least first piston shaft for connection to a pressure sensitive device. The at least first end cap bearing preferably includes a portion thereof extending partially axially into the axial bore of the outer shell to define an internal piston stop.

In accordance with another preferred form of the present invention, a variable differential capacitive sensor includes an outer shell defining a first electrode of the capacitive sensor, the outer shell having an axial bore formed therethrough, and having at least a first open axial end in fluid communication with the axial bore; at least a first piston and a second piston operatively linked together, the at least first and second pistons reciprocatingly axially moveable within the axial bore of the outer shell, the at least first piston and second piston respectively defining a second electrode and a third electrode of the capacitive sensor; at least a first piston shaft, the at least first piston shaft being operatively linked to the at least first piston and second piston; and at least a first end cap bearing, the at least first end cap bearing being mounted on the outer shell at the least first open axial end thereof, the at least first end cap bearing having a shaft opening formed through the thickness thereof, the at least first piston shaft being received by and reciprocatingly slidably moveable in the shaft opening.

The outer shell preferably includes an inner wall defining the axial bore, and each of the at least first piston and second piston preferably includes an outer radial surface. The outer radial surface of each of the at least first piston and second piston is preferably spaced from the inner wall of the outer shell by a predetermined distance. Also, the outer shell of the variable differential capacitive sensor is preferably cylindrical in overall shape.

The outer shell of the variable differential capacitive sensor preferably includes a first axial portion having a first inner diameter defined by the inner wall, and at least a second axial portion having a second diameter defined by the inner wall and being situated axially adjacent to the first axial portion, the first diameter being different from the second diameter. The at least first piston and second piston are preferably reciprocatingly moveable within the axial bore over the first portion and the at least second portion of the outer shell.

The first piston of the variable differential capacitive sensor preferably includes an axial face, and the second piston preferably includes an axial face. The axial face of the first piston is disposed in an opposite direction to that of the axial face of the second piston. The axial face of the at least one of the first piston and the second piston preferably has formed therein a cutout portion.

The at least first end cap bearing of the variable differential capacitive sensor preferably has a fluid vent opening formed through the thickness thereof, the fluid vent opening being in fluid communication with the axial bore of the outer shell. The sensor further includes at least one pivot pin disposed on and extending outwardly from the outer shell.

The outer shell of the variable differential capacitive sensor preferably includes a second open axial end opposite the at least first open axial end, the second open axial end being in fluid communication with the axial bore. The sensor further preferably includes a second end cap bearing, the second end cap bearing being mounted on the outer shell at the second open axial end thereof, the second end cap bearing having a shaft opening formed through the thickness thereof. The sensor further preferably includes a second piston shaft, the second piston shaft being received by and reciprocatingly slidably moveable in the shaft opening of the second end cap bearing, the at least first piston shaft being connected to the at least first piston, and the second piston shaft being connected to the second piston.

The variable differential capacitive sensor further preferably includes a bumper situated on the second piston shaft and engageable with the second end cap bearing, and an end cap, the end cap being situated on the at least first piston shaft for connection to a pressure sensitive device, such as a Bourdon tube. The at least first end cap bearing preferably includes a portion thereof extending partially axially into the axial bore of the outer shell to define an internal piston stop.

In accordance with another form of the present invention, a pressure sensor includes the structure of either the variable capacitive sensor or the variable differential capacitive sensor described previously, in combination with a pressure sensitive Bourdon tube. The Bourdon tube has an expandable and contractable portion which moves in response to pressure sensed by the Bourdon tube, the expandable and contractable portion being operatively linked to the at least first piston shaft of the capacitive sensor to move the at least first piston shaft and the at least first piston and/or the second piston operatively linked thereto within the axial bore of the outer shell of the capacitive sensor in response to movement of the expandable and contractable portion of the Bourdon tube. The variable capacitive sensor further preferably includes at least one pivot pin, the at least one pivot pin being disposed on and extending outwardly from the outer shell. The pressure sensor further preferably includes as least one pivot bearing, the at least one pivot bearing being mounted to the Bourdon tube, the at least one pivot bearing having an opening formed therein for pivotably receiving the at least one pivot pin of the capacitive sensor to allow the capacitive sensor to pivot thereon with movement of the expandable and contractable portion of the Bourdon tube.

A variable capacitive pressure sensor formed in accordance with the present invention includes a pressure sensitive Bourdon tube, the Bourdon tube having an expandable and contractable portion which moves in response to pressure sensed by the Bourdon tube; a first plate mounted on the expandable and contractable portion of the Bourdon tube, the first plate defining a first electrode of the capacitive pressure sensor and being moveable with the expandable and contractable portion of the Bourdon tube; and a second plate, the second plate being fixedly situated in proximity to the first plate and defining a second electrode of the capacitive pressure sensor, the first and second plates defining a spacing therebetween, the spacing being changeable with movement of the expandable and contractable portion of the Bourdon tube and the first plate mounted thereon. The variable capacitive pressure sensor may include a first mounting sector, the first mounting sector being coupled to the Bourdon tube, the second plate being mounted on the first mounting sector. Preferably, the first mounting sector includes a plate-like member residing in a plane, and preferably the second plate extends perpendicularly from the first mounting sector in one of underlying and overlying relationship to the first plate. A first insulator is preferably included. The first insulator is mounted to the Bourdon tube and extends in an axial direction thereto, the first mounting sector being mounted on the first insulator.

In accordance with another form of the present invention, a variable differential capacitive pressure sensor preferably includes a pressure sensitive Bourdon tube, the Bourdon tube having an expandable and contractable portion which moves in response to pressure sensed by the Bourdon tube, the expandable and contractable portion having an upper surface and a lower surface situated opposite the upper surface; a first plate mounted on the lower surface of the expandable and contractable portion of the Bourdon tube, the first plate at least partially defining a first electrode of the capacitive sensor and being moveable with the expandable and contractable portion of the Bourdon tube; a second plate, the second plate being fixedly situated in proximity to the first plate, the first and second plates defining a first spacing therebetween, the first spacing being changeable with movement of the expandable and contractable portion of the Bourdon tube and the first plate mounted thereon, the second plate defining a second electrode of the capacitive pressure sensor; a third plate, the third plate being mounted on the upper surface of the expandable and contractable portion of the Bourdon tube, the third plate at least partially defining with the first plate the first electrode of the capacitive pressure sensor and being moveable with the expandable and contractable portion of the Bourdon tube; and a fourth plate, the fourth plate being fixedly situated in proximity to the third plate, the third and fourth plates defining a second spacing therebetween, the second spacing being changeable with movement of the expandable and contractable portion of the Bourdon tube and the third plate mounted thereon, the fourth plate defining a third electrode of the capacitive pressure sensor.

The variable differential capacitive pressure sensor preferably further includes a first mounting sector, the first mounting sector being coupled to the Bourdon tube, the second plate being mounted on the first mounting sector; and a second mounting sector, the second mounting sector being coupled to the Bourdon tube, the fourth plate being mounted on the second mounting sector. More specifically, the variable differential capacitive pressure sensor has the first mounting sector including a first plate-like member residing in a first plane, and has the second plate extending perpendicularly from the first mounting sector in underlying relationship to the first plate. The second mounting sector includes a second plate-like member residing in a second plane which is disposed parallelly to the first plane, and the fourth plate extends perpendicularly from the second mounting sector in overlying relationship to the third plate. Also, a first insulator is preferably included, the first insulator being mounted to the Bourdon tube and extending in an axially direction thereto, the first mounting sector being mounted on the first insulator, and a second insulator is preferably included, the second insulator being mounted to the Bourdon tube and extending axially direction thereto, the second mounting sector being mounted on the second insulator.

In accordance with another form of the present invention, a variable capacitive pressure sensor preferably includes a pressure sensitive Bourdon tube, the Bourdon tube having an expandable and contractable portion which moves in response to pressure sensed by the Bourdon tube, the Bourdon tube having a first surface situated on the expandable and contractable portion of the Bourdon tube and which defines a first electrode of the capacitive pressure sensor; and a first plate, the first plate being fixedly situated in proximity to the first surface and defining a second electrode of the capacitive pressure sensor, the first plate and the first surface of the Bourdon tube defining a spacing therebetween, the spacing being changeable with movement of the expandable and contractable portion of the Bourdon tube and the first surface situated thereon.

Another embodiment of a variable differential capacitive sensor, formed in accordance with the present invention, preferably includes a pressure sensitive Bourdon tube, the Bourdon tube having an expandable and contractable portion which moves in response to pressure sensed by the Bourdon tube, the expandable and contractable portion having an upper surface and a lower surface situated opposite the upper surface, the upper and lower surfaces defining a first electrode of the capacitive sensor; a first plate, the first plate being fixedly situated in proximity to the lower surface of the Bourdon tube, the first plate and the lower surface of the Bourdon tube defining a first spacing therebetween, the first spacing being changeable with movement of the expandable and contractable portion of the Bourdon tube and the lower surface situated thereon, the first plate defining a second electrode of the capacitive sensor; and a second plate, the second plate being fixedly situated in proximity to the upper surface of the Bourdon tube, the second plate and the upper surface of the Bourdon tube defining a second spacing therebetween, the second spacing being changeable with movement of the expandable and contractable portion of the Bourdon tube and the upper surface situated thereon, the second plate defining a third electrode of the capacitive sensor.

A digital pressure gauge, which is preferably light powered, includes a pressure sensor, such as one of the sensors described previously, and an electronic circuit. The pressure sensor provides a value of capacitance in response to pressure sensed by the pressure sensor. The electronic circuit includes a microprocessor and a display which is electrically connected to the microprocessor. The microprocessor causes the display to indicate the pressure sensed by the pressure sensor in response to the value of capacitance provided by the pressure sensor. Preferably, the electronic circuit further includes a source of solar power. The source of solar power provides electrical power to the microprocessor and the display.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 5a is a series of illustrative front views of the display shown in FIG. 5, displaying incremental pressure changes.

DETAILED DESCRIPTION OF THE INVENTION

Figure 1:
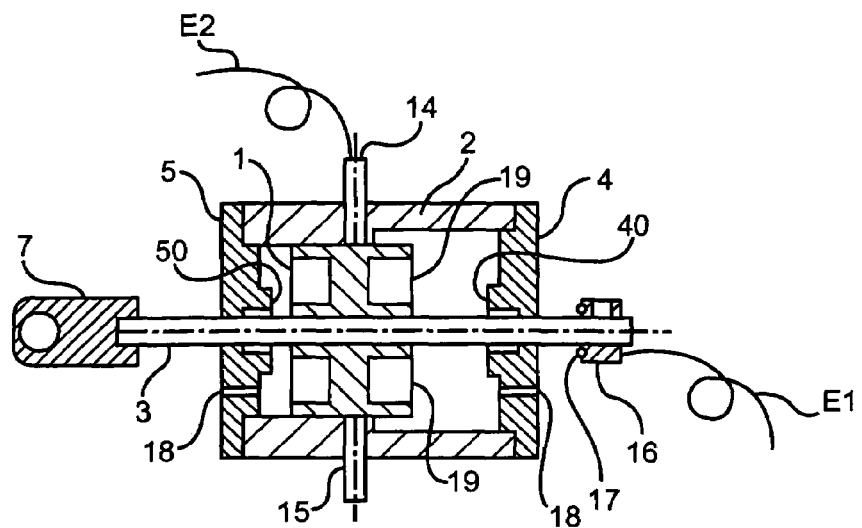
FIG. 1 is a cross-sectional view of one form of a piston type capacitive sensor of the present invention.

FIG. 1 shows a cross-section of the cylindrical sensor of the present invention. The first electrode is a preferably aluminum piston 1 having preferably a diameter of 0.500 inches. The piston is rigidly attached to the sensor shaft 3 by press fit or set screw, not shown. The sensor shaft is preferably a ground stainless steel rod with close outer diameter tolerance. In production, several sizes can be selected for proper fit into the end cap bearings 4 and 5. The end cap bearings are preferably made of a low dielectric stable plastic, such as polycarbonate. The end cap bearings are preferably pressed into each end of the cylinder 2. An adhesive can also be used to secure the end caps to the cylinder ends. The internal diameters of the cylinder 2, which defines the second electrode, are machined from preferably an aluminum tube, keeping the two diameters concentric to the central axis. The end cap bearings, when pressed into the cylinder, locate on the internal machined diameters to best locate the piston 1 in the center of the cylinder 2 in order to provide a uniform gap between the outside diameter of the piston 1 and the two inside diameters of the cylinder 2. It is important to have a tight clearance between the shaft 3 and the end cap bearing holes to keep the piston position rigid and concentric within the cylinder. A small vent hole 18 in the end caps 4 and 5 allows air to enter and escape from the inside. The hole can be sized to provide air shock dampening. A filter, such as a porous disk, not shown, can be placed in the vent holes to prevent particles from entering the sensor. Pressed into the mid part of the cylinder 2, ideally at the center of gravity, are two pivot pins 14 and 15 on opposite sides, transverse to the central axis as shown. Electrically connected to the piston electrode a thin wire E1 is attached to the shaft end to provide one capacitive electrode. A thin wire E2 is attached to the cylinder through one pivot pin 14, which cylinder defines the second capacitive electrode. Attached to one end of the shaft is an end piece 7 used to attach the shaft to a Bourdon tube tip so that the free travel of the Bourdon tube determines the piston position. The end piece 7 is preferably made of an insulator material similar to the bearing end caps, such as polycarbonate. An alternate material for the end piece and end caps is ceramic, used in high accuracy applications to minimize the dielectric change with temperature. Such ceramic insulators can be in combination with the plastic insulators or can be used with metal end caps. One or both axial ends of the piston 1 may have cylindrical cutout portions 19 formed therein to reduce the overall weight of the piston.

Figure 1A:
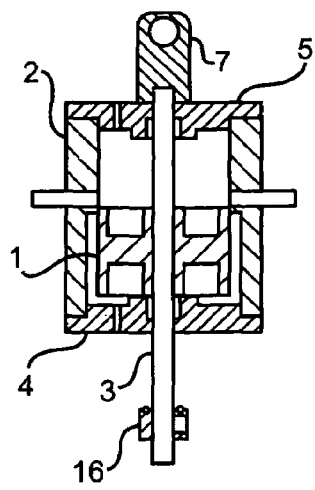
FIGS. 1a, 1b and 1c are cross-sectional views of the piston type sensor shown in FIG. 1 at various positions.
Figure 1B:
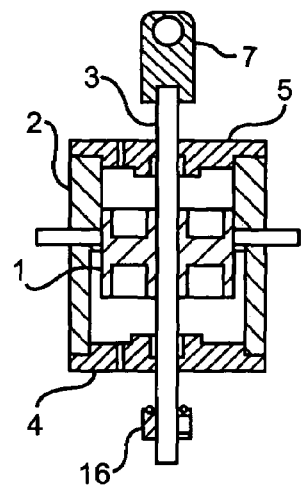
Figure 1C:
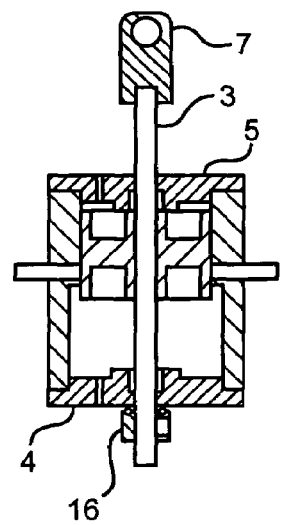

The piston position shown in FIG. 1*a* is near the bottom end of the cylinder where the cylinder internal diameter is greater and provides a large gap between the piston and the cylinder wall, preferably approximately 0.040". In this case, the capacitance, as measured between the piston and the cylinder, is low, that is, on the order of a few picofarads, for example, about 5 pF. As the piston freely moves upward, as shown in FIG. 1*b*, the proportion of the engagement of the piston within the narrow side of the cylinder increases. The clearance between the piston and the cylinder in the narrow side is preferably only 0.004". The capacitance increases as the piston translates toward the close clearance side of the cylinder. At the top of the range, as shown in FIG. 1*c*, the piston is substantially within the narrow internal diameter of the cylinder, and the capacitance is at its maximum, which is about 30 pF in this example. The capacitance change is nearly linear relative to the displacement of the piston with the exception of end effects. The end caps 4 and 5 are shown to include internal piston stops 40, 50, respectively, to prevent the cylinder from having full contact with the end cap to minimize the capacitance end effect and to prevent over extension of the Bourdon tube. The collar 16 is attached to the back end of the shaft 3 and includes an elastic bumper 17, such as an o-ring, that stops the motion of the Bourdon tube directly through the shaft and serves as an overload stop against the lower cylinder end cap 4. A more sensitive sensor can be made by reducing the narrow side clearance and thus increases the capacitance change with displacement. The design and sizes of the sensor as described can be manufactured according to normal engineering tolerances.

Figure 3A:
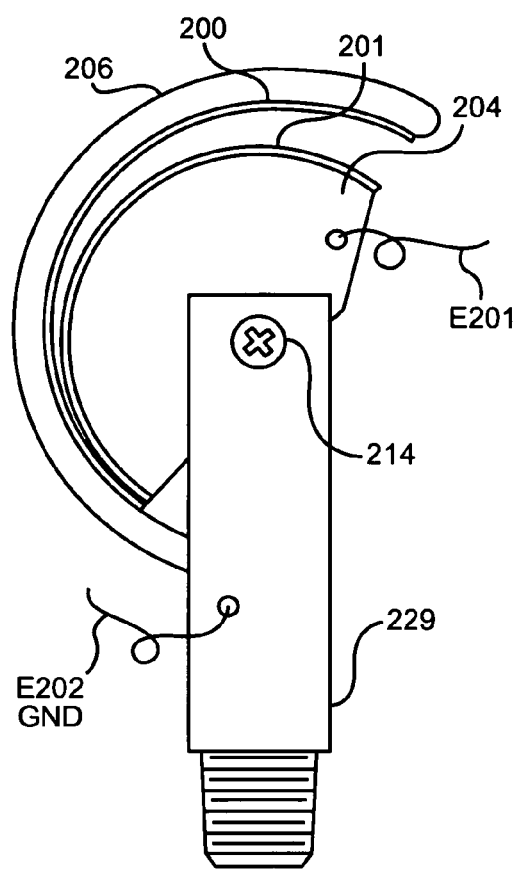
FIG. 3a is a front view of a coincident Bourdon capacitive sensor of the present invention.
Figure 3B:
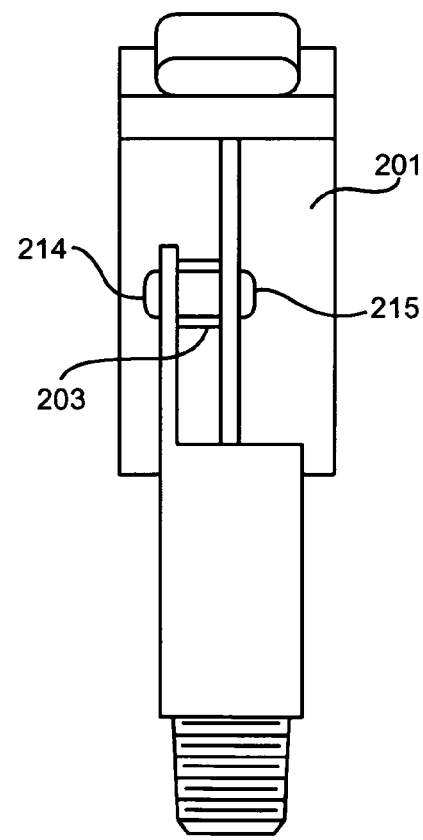
FIG. 3b is a side view of the coincident Bourdon capacitive sensor of the present invention.
Figure 3C:
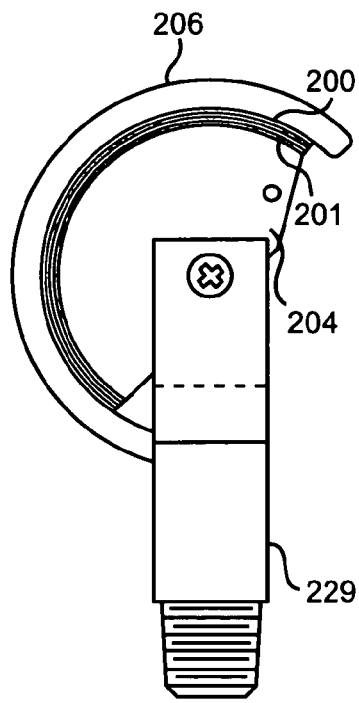
FIGS. 3c, 3d and 3e are front views of the coincident Bourdon sensor of the present invention shown in FIGS. 3a and 3b at various positions.
Figure 3D:
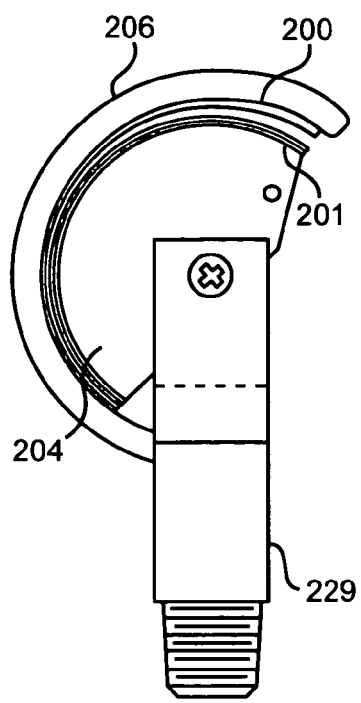

In a second preferred embodiment, the Bourdon tube tip is free, unattached, and the radial motion of the Bourdon tube itself is used as the moveable electrode in a capacitive pressure sensor. FIG. 3*a* shows a standard 2" phosphor bronze Bourdon tube 206 attached to a traditional pressure gauge socket 229 with a thin plate 200 attached to the Bourdon tube inside wall and which acts as one electrode. The Bourdon electrode 200 forms a capacitor with a fixed isolated plate 201 spaced just inside of the Bourdon electrode 200. Unlike the piston cell where the effective area of the electrodes changes, the capacitance change of the second preferred embodiment is a result of a changing gap between the electrodes. The capacitance at the bottom of the pressure range is high since the gap is small, the capacitance decreasing in an inverse relation to the pressure applied. A uniform gap of about 0.006" is built into the sensor at zero pressure, see FIG. 3*c*, where it can be seen that two partially cylindrical concentric shell electrodes, one fixed and one attached to the Bourdon tube have a surface area of preferably about 2 square inches and a capacitance of 50 pF at zero pressure. The internal pressure of the Bourdon causes the near circular shape of the Bourdon to extend, increasing the gap mostly near the free end of the Bourdon, as shown in FIG. 3*d*. At the top of the range, see FIG. 3*e*, the tip excursion is about 0.100", corresponding to a capacitance of 20 pF. The Bourdon tube is unimpeded by any attachments. Unlike the conventional use of a Bourdon tube, the spring rate does not need to overcome the frictional effects of a movement that is attached to the free end.

DETAILED DESCRIPTION OF THE PREFERRED EMBODIMENT

The description of the preferred embodiment is exemplary in the application of the primary invention to demonstrate the constructional advantage of the sensor, as previously described. The sensor of FIG. 1 is attached to a Bourdon tube, shown in FIGS. 2*a* and 2*b*. The Bourdon tube is responsive to the pressure applied. Bourdon tubes are used in a wide variety of pressure ranges, from about 15 psi to about 20,000 psi, and exhibit a large travel throughout the pressure range. When used in mechanical pressure gauges, the Bourdon tube shape is designed to travel relatively linearly in order to translate the tip motion through a geared movement to the rotary sweep of a pointer over a predictable printed dial scale to indicate the pressure. The digital electronic approach of measuring travel has the advantage of being able to mirror the travel and custom match a calibration lookup table to the exact output and linearity of the elastic element.

Figure 2A:
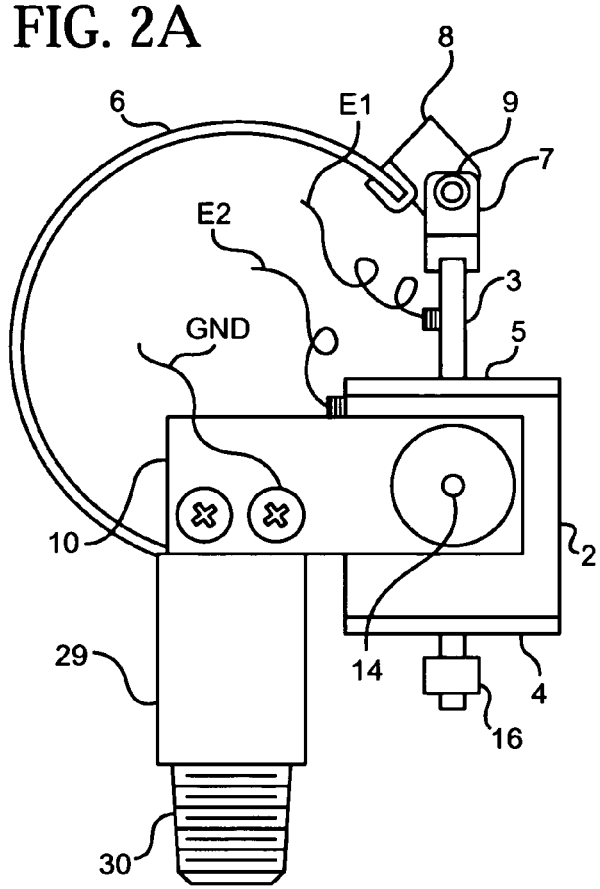
FIGS. 2a and 2b are respectively front and side views of the piston type sensor with a Bourdon tube attached thereto.
Figure 2B:
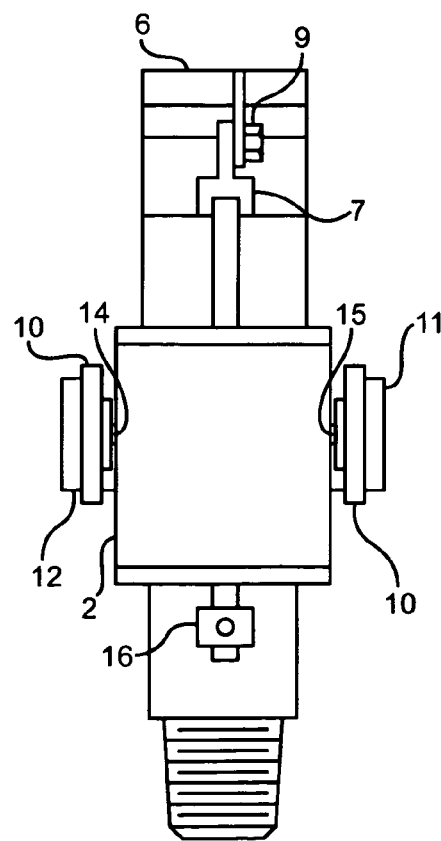
Figure 2C:
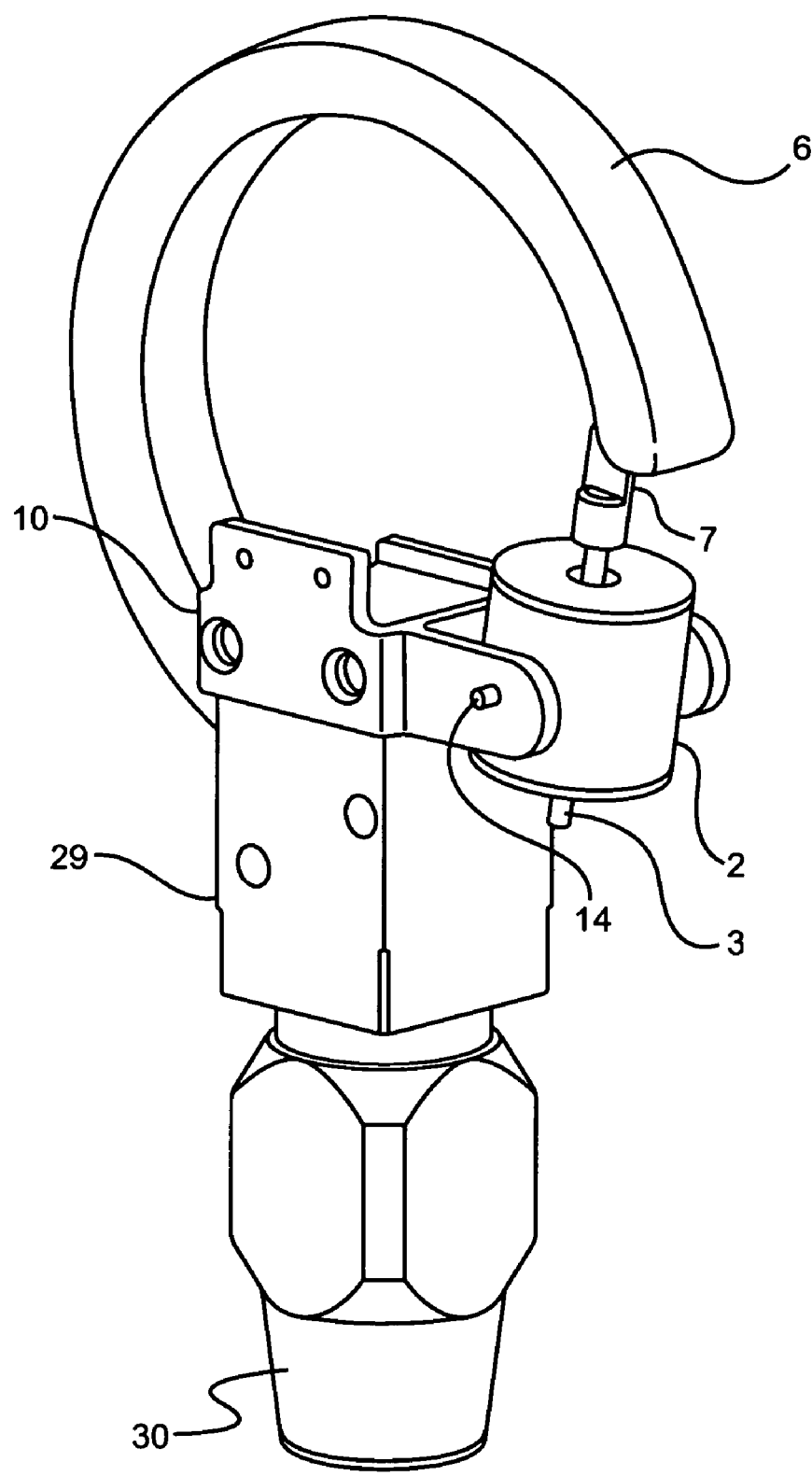
FIG. 2c is a perspective view of the piston type sensor and Bourdon tube attached thereto shown in FIGS. 2a and 2b.

Referring to FIGS. 2*a* and 2*b*, "C" shaped Bourdon tube 6 is rigidly attached by soldering or welding or the like to a gauge socket 29 and mounting bracket 10. The bracket 10 has two pivot bearings, 11 and 12, on opposite sides for the engagement of the two pivot pins 14 and 15. The bearings are made of an insulator material and include a transverse axis-bearing hole for pivotal attachment of the sensor pins 14 and 15, enabling the sensor to rotate. The bearing material preferably has a low dielectric constant and is both electrically and dimensionally stable. For this particular embodiment, a proven polycarbonate compound is chosen for the bearings and end caps. The shaft 3 is of known diameter and may be selected for a low clearance fit to the bearing cap hole. This fit is important to keep the piston in the center of the cylinder and to allow free motion of the piston. The piston alignment is such that the capacitance is low at the bottom of the range when it is engaged primarily in the larger internal diameter end of the cylinder 2. However, the opposite arrangement of the sensor is also possible, especially if the elastic member, in this case the Bourdon tube, has a low thermoelastic coefficient, such as provided by being made from Ni-Span-C, a 43% Nickel alloy. For Bourdon tubes not made of an iso-elastic metal, the thermoelastic effect can be compensated by considering the differential thermal expansion of the piston and cylinder diameters. For the example described above, with a piston diameter of 0.500" and a cylinder inner diameter of 0.508", thus having a gap of 0.004", consider the materials of the piston and shaft both to be aluminum and having a linear coefficient of expansion of $12 \times 10^{-6}$ in/in $°$ F., and a temperature change of 40° C. or 72° F. The gap can be calculated to be 0.004008". The capacitance is relative to the inverse of the gap and is thus 0.2% lower, offsetting somewhat the higher capacitance caused by the change in the elastic modulus with temperature. By using a high expansion cylinder material and a low expansion piston material, this compensation is greater and can offset the error due to the thermoelastic modulus change. Whereas thermal expansion changes normally cause a "zero shift" that is consistent within the entire range, the compensation of the differential expansions of the piston and cylinder cause a "span shift" that directly compensates for the "span shift" caused by the thermoelastic properties of the spring Bourdon material.

The shaft 3 is terminated at the top to an end piece 7. The end piece is also preferably made of a material that has a low dielectric constant, or permittivity, and is stable with environmental factors, such as ambient temperature and humidity. The end piece 7 is bonded to the shaft by an adhesive, or is threaded, or in other ways of attachment, such that the end piece 7 is rigidly attached to the shaft. The shaft end piece 7 is attached to the Bourdon tube 6 with a shoulder screw 9, for example, threaded into a Bourdon tip 8 having a close clearance fit. The piston 1 is made light by having a concave end shape. The spring rate of the Bourdon tube is such as to overcome the effect of the piston weight to minimize the positional error.

Referring to FIGS. 2a and 2b, the Bourdon tube 6 is attached and sealed to a gauge socket 29 by solder, welding or the like. The gauge socket 29 includes a threaded process connection 30, such as an NPT tapered pipe thread, for attachment to a pipe line or pressure vessel. As the pressure is introduced into the Bourdon tube, the Bourdon tip 8 at the Bourdon tube end extends in an upward path, repositioning the low friction sensor assembly. The shaft extends and the cylinder rotates about the bearing pins 14 and 15 slightly counterclockwise. The capacitance is directly related to the proportion of the piston in the narrow versus the wide internal diameter of the cylinder. In this way, the capacitance is directly proportional to the pressure if the motion of the Bourdon tube is linear. The accuracy is further improved over the purely mechanical style by the method of calibration that is available to the electronics that is not practical in mechanics. A thin flexible wire E1 is attached to one piston shaft 103b to provide a connection to one side of the capacitor electrode (i.e., piston 101b). Another thin flexible wire E3 is attached to the cylinder body to provide a connection to the other capacitor electrode. A third flexible wire (labeled by "GND") is attached to the gauge socket as earth ground. A fourth thin flexible wire E2 is connected to the other piston shaft 103a to provide a connection to another capacitor electrode (i.e., piston 101a). The sensor has a three wire connection to the electronic detection circuit including the ground. Wires E1 and E2 are isolated from each other and ground. The entire system including the electronic interface is housed in a case to protect against environmental contamination, such as dust and humidity.

Figure 1D:
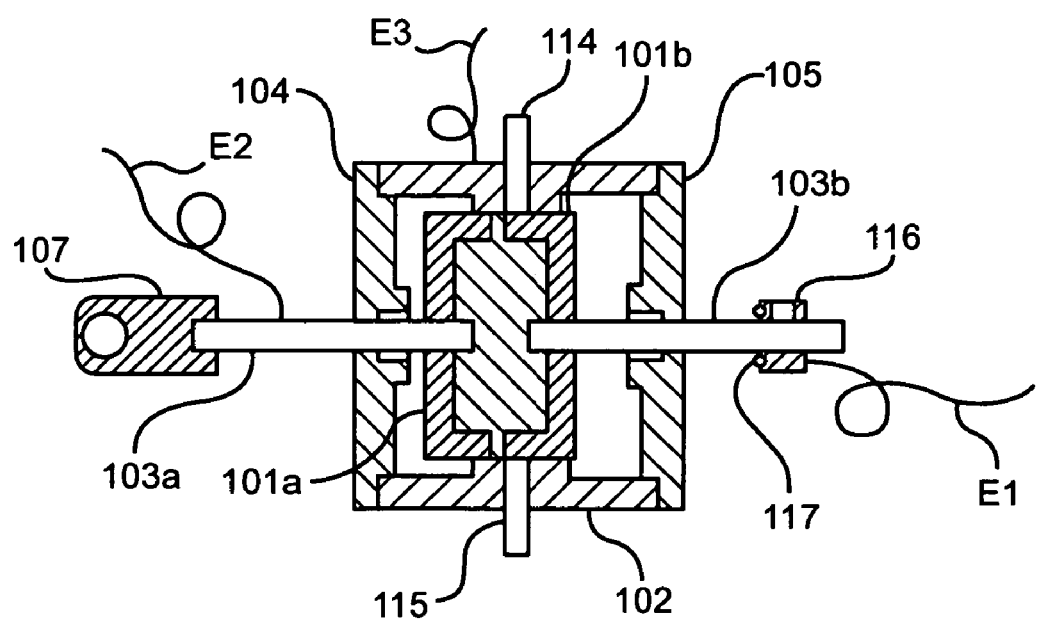
FIG. 1d is a cross-sectional view of a piston type differential capacitance sensor formed in accordance with the present invention.
Figure 1E:
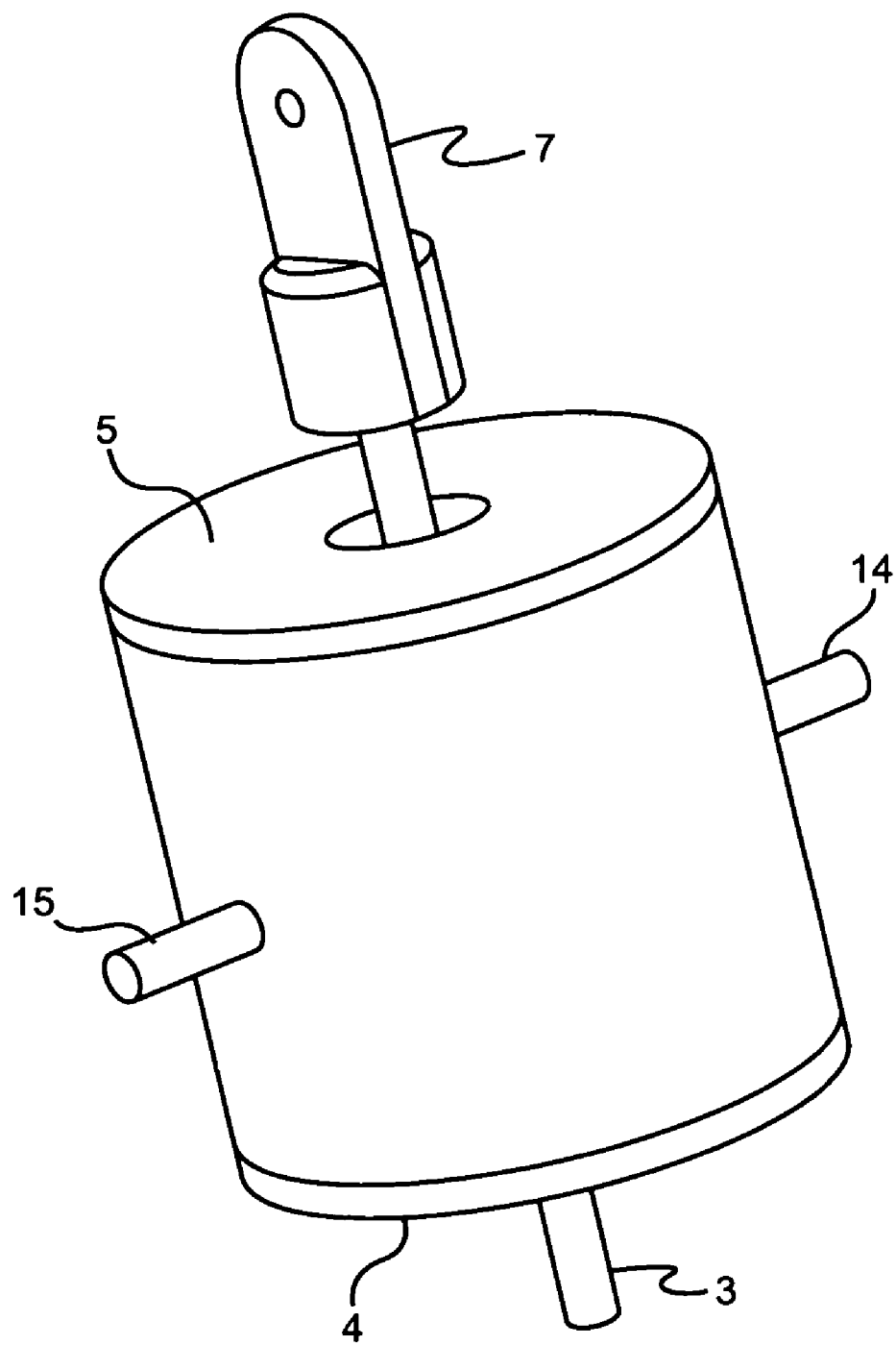
FIG. 1e is a perspective view of the piston type capacitive sensor shown in FIGS. 1 and 1a–1d.

A differential configuration of the sensor is now described with reference to FIG. 1d. The cylinder electrode 102 is stepped in the center inside diameter to create a small gap to two piston electrodes 101a and 101b, which act as electrodes. The two pistons 101a and 101b are rigidly and electrically attached to the two shafts 103a and 103b suspended within the cylinder 102 by insulative endcaps 105 and 104 respectively. As in the previous embodiment, attachments to the cylinder 102 are made with side pivot pins 114 and 115 and with a shaft tip 107. A stop 116 is provided on the shaft 103b with an o-ring 117 to prevent disengagement and to extend the overpressure capability by limiting the travel of the Bourdon tube or other elastic element that the tip 107 is attached to. Electrical connections are made to the sensor by thin flexible wires E1, E2 and E3. The capacitance C1 between E1 and E3 results from the close relation of the piston 101a and cylinder 102 in the narrow gap section of the cylinder internal diameter and the capacitance C2 between E2 and E3 results from the close interaction between the piston 101b and cylinder 102. An internal piston insulator 106 to which pistons 101a and 101b are separately mounted on opposite axial sides thereof is made of a low dielectric plastic such as polycarbonate to electrically isolate pistons 101a and 101b from each other and to minimize the capacitance between pistons 101a and 101b. As the piston translates within the cylinder, the Bourdon tip pulls the inline piston assembly to the left (when viewing FIG. 1d), reducing the effective area between the cylinder 102 and piston 101b and at the same time increasing the effective area between the cylinder 102 and piston 101a. The capacitance relation of (C1+C2)/C1 is self compensating and self referenced. Thus, the same factors that effect errors in C1 also effect errors in C2, and the two errors will cancel, leaving a factor that is exactly representative of the piston position.

DETAILED DESCRIPTION OF THE SECOND PREFERRED EMBODIMENT

Figure 3E:
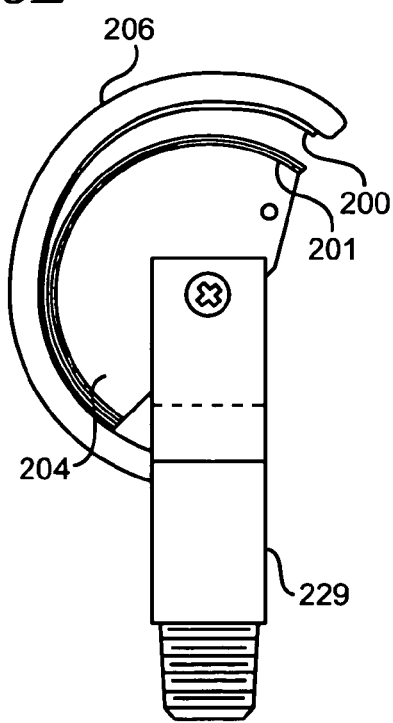

The second preferred embodiment, shown in FIG. 3a, utilizes the Bourdon tube itself as one electrode in a variable capacitance pressure sensor. The full and unimpeded motion of the Bourdon tube is preferably used in this second preferred embodiment, where frictional effects are eliminated. For Bourdon tubes 206 made of a preferred cross-sectional shape, either oval or asymmetrical, a conductive shell 200 is attached to the Bourdon tube inside wall to provide the outside concentric surface. The inner concentric surface 201 is attached to a mounting sector 204 by a method that sets a preferred uniform radial gap between the inner concentric surface 201 and the concentric Bourdon electrode 200. The capacitance is set up between the inner and outer electrodes 201 and 200. As the pressure increases, the Bourdon electrode 200 extends radially away from the stationary inner electrode 201. This can be seen in FIGS. 3c, 3d and 3e, representing three increasing pressures, respectively. The fixed electrode sector 204 is attached by an insulator 203 made of a low dielectric stable plastic, such as polycarbonate. The insulator 203 is situated along the axial direction of the Bourdon tube 206 and mounting sector 204 so that by geometric perpendicularity, differential expansion effects are minimum. Other materials for the insulator 203 such as glass or ceramic may in some cases be preferable. Other materials used for Bourdon tubes, such as NiSpan nickel alloy, can reduce the ambient effects due to the modulus of elasticity thermoelastic effect, making the overall temperature effect negligible. The insulator 203 is attached with fasteners, such as screws or rivets 214 and 215, in a method that allows some adjustment. The moveable electrode 200 is electrically connected to the gauge socket 229 that connects the gauge to the outside world via pipe threads or an appropriate sealing fitting. Bourdon tubes can be made flat, such as described in U.S. Pat. No. 4,646,406, which issued to John Weiss et al., the disclosure of which is incorporated herein by reference, or the traditional oval section Bourdon tube, can be attached with a strip of similar material, phosphor bronze or stainless steel, with good results. The electrical connection E202 to the Bourdon electrode is at the base attachment or socket 229 and is fixed, as is the electrical connection E201 to the isolated fixed electrode. The movement in this second preferred embodiment is unimpeded by the electrical connections E201 and E202. The Bourdon tube 206 does not need a traditional tip, which is advantageous since the weight of the tip is undesireable anyway. The position error is minimized and the ambient error due to thermal expansion is also minimized by having the sector 204 of the same material as the Bourdon 206.

Figure 3F:
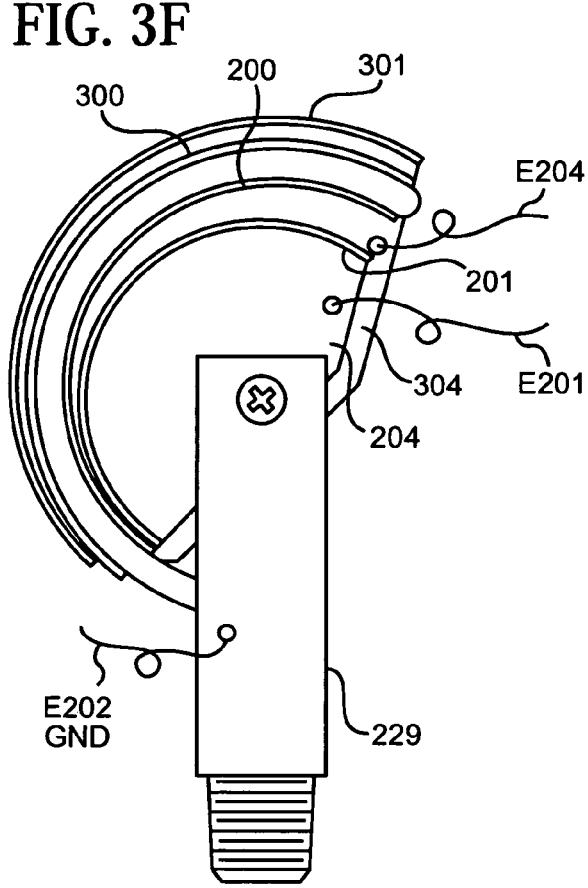
FIG. 3f is a front view of a differential coincident Bourdon sensor of the present invention.
Figure 3G:
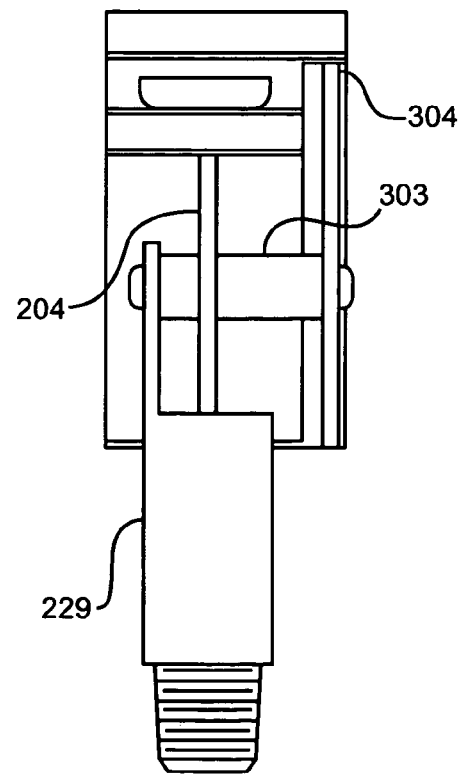
FIG. 3g is a side view of the differential coincident Bourdon sensor of the present invention.
Figure 3H:
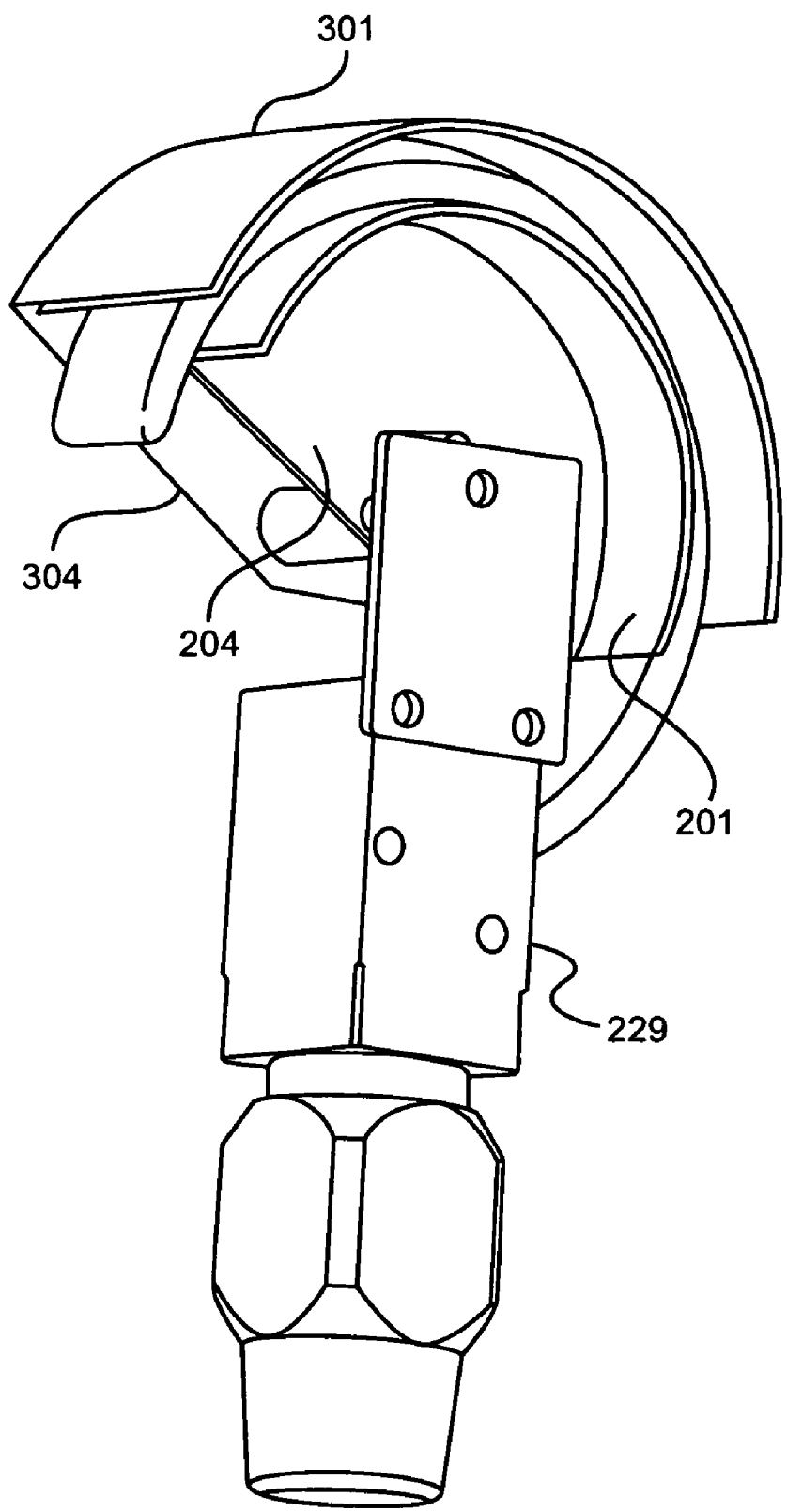
FIG. 3h is a perspective view of an alternative form of the differential coincident Bourdon sensor of the present invention.

A differential Bourdon concentric sensor is shown in FIG. 3f. A third, curved fixed electrode capacitance plate 301 is provided. As with the previous version, a separate Bourdon outer shell 300 is attached to the Bourdon tube. This separate shell is omitted, and shell 200 may be omitted, as in the previous version, where the Bourdon tube walls are flat and act as the electrode, such as shown in FIG. 3h. The outer electrode capacitance plate 301 is positioned to have a controlled gap to the aforementioned Bourdon outer shell 300. The isolated outer electrode plate 301 is attached to the fixed gauge socket 229 in the same manner as the first fixed isolated electrode plate 204 with a sector 304 and an insulator 303. As the Bourdon tube extends under free motion, the capacitance between the Bourdon inner shell 201 and the inner fixed isolated electrode 200 decreases with increasing pressure, and the capacitance between the Bourdon outer shell 300 and the outer fixed isolated electrode 301 increases with the same increasing pressure. The movement of the Bourdon is unimpeded by the thin wire electrical connections E201, E202 and E204 respectively to sector 204, socket 229 and sector 304, as they are attached to stationary elements. The differential measurements as previously described provide a reference within the sensor itself. Precision is improved in both the top and bottom of the range and the reference is incorporated within the sensor.

Figure 4:
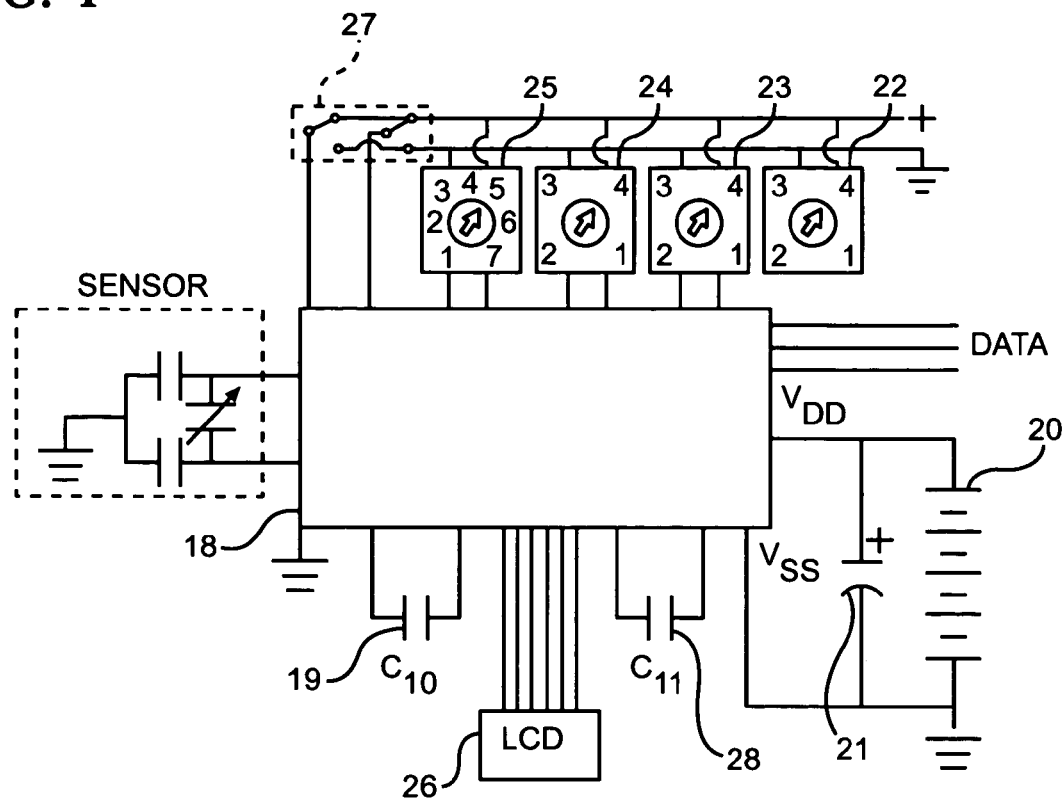
FIG. 4 is a circuit diagram of a solar powered pressure gauge formed in accordance with the present invention.

The basic circuit diagram of FIG. 4 is shown to describe the components and features incorporated in the preferred embodiments. The integrated circuit 18, herein referred to as the IC, is a low powered device, preferably an ASIC-type, although a microprocessor can be used, such as from the family of MSP430 microprocessors manufactured by Texas Instruments Incorporated of Dallas, Texas. The inputs to the IC 18 include the variable capacitor pressure sensor of FIG. 1 or FIG. 3 and a reference capacitor 19 for sampling or reading the electrical characteristics relative to the pressure applied to the sensor. The reference capacitor 19 may be included internally to the IC 18 or, as described, the reference capacitor can be incorporated into the differential sensor. A ratio-metric technique is used to measure the capacitance of the sensor to the reference capacitor 19; a ratio of the sensor capacitance and the fixed reference capacitor 18 is the result. Alternatively, the ratio (C1=C2)/C1 is used with the differential sensors herein described. Also, the low power, voltage independent method and circuit for high resolution capacitance measurement disclosed in U.S. provisional application Ser. No. 60/753,381, entitled "Capacitance Measuring Circuit", filed on Dec. 21, 2005, the disclosure of which is incorporated herein by reference, may be used to measure the change in capacitance of the capacitive sensors of the present invention.

Referring again to FIG. 4, the reference capacitor 19 has a temperature coefficient associated with the change of capacitance with ambient temperature. It is desirable to choose a capacitor type with a low capacitance change with temperature. An example of a capacitor with a low temperature coefficient is offered by Illinois Capacitor, Inc. of Lincolnwood, Ill., series BCR. Alternatively, a capacitor with an NPO coefficient is desirable. The reference capacitor is chosen to have a value within the range of the sensor, 25 pF for example. A capacitor with a slight negative temperature coefficient can compensate for the temperature effect of the linear expansion change and may be used to offset this effect. Offsetting the reference capacitor coefficient cannot compensate the sensor error due to the thermoelastic effect of the Bourdon tube. With a low starting capacitance, as shown in FIG. 1a, a sensor shunt capacitor connected across the output of the sensor and ground can be used, such as a 15 pF capacitor, to bring the capacitance to be measured into a higher capacitance to improve the signal to noise ratio. The shunt capacitor also should have a low temperature coefficient to match the reference capacitor 19. The capacitive sensor, already described, has the advantage of having a low ambient temperature error, as the direction of travel of the piston electrode is perpendicular to the capacitance electrode surfaces and the travel is large compared to the gap between the electrode surfaces. On the second preferred embodiment, the low ambient error is attributed to the insulator being perpendicular to the capacitance electrode surfaces. This is a chief advantage of using the piston and cylinder linear capacitor and the coincident bourdon capacitive sensor.

Various methods of arriving at the capacitance ratio can be employed. The capacitors may be in an oscillator circuit and a variable frequency is measured, and a counter may be used over a fixed time period or a charge and discharge time can be compared to that of the reference. The ratio method is preferable to other techniques, as it is immune to voltage variations that may result from the variable, light powered, voltage supply shown in FIG. 4, which includes a solar cell 20 and a source capacitor 21. Special circuits that address the variable low power source and extremely low sensor currents are the subject of a separate patent application filed concurrently herewith.

The power source circuit, solar battery 20 and energy storage capacitor 21, may include voltage detection and a power switch to prevent the IC from receiving a voltage below rated voltage in order to avoid a lock up; such circuits are described in the aforementioned Jamieson patent (U.S. Pat. No. 5,196,781). The voltage detecting and switching can also be incorporated within the IC 18, where very low power FET (field effect transistor) components are used. Alternatively, the voltage detection within the IC can selectively turn off the LCD driver and detection routine so that, when it is turned back on, it would not cause a voltage drop as severe as that caused by re-powering the entire device.

Again, referring to the circuit of FIG. 4, four user selectable rotary switches (22, 23, 24 and 25) provide input signals to the IC 18. The user selectable switches customize the gauge for the application. Switch 22 is preferably a four-position rotary switch for setting up the data averaging. Position 1 is no average; Position 2 averages the last two readings; Position 3 averages the last four readings; and Position 4 averages the last eight readings. This function acts to dampen the pressure measurement. Switch 23 is preferably a four-position rotary DIP (dual in-line package) switch for selecting the scale and units of measure.

Figure 5:
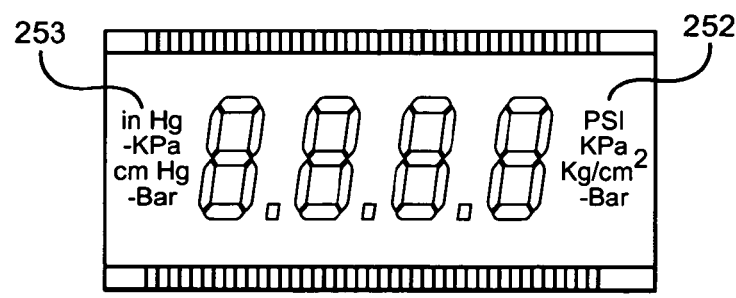
FIG. 5 is a front view of the LCD display of a digital pressure gauge of the present invention.

Referring now to FIG. 5 and switch 23 of FIG. 4, the LCD display is shown with all segments active. The first position of switch 23 selects the "PSI" (pounds per square inch) icon 252 on the display for the pressure scale and "inHg" (inches Mercury column) icon 253 for the vacuum scale. The second position of switch 23 selects the "KPa"(Kilopascal) scale for pressure and "−KPa" for vacuum. The third position of the rotary switch 23 selects the "Kg/cm$^2$"(kilograms per square centimeter) for pressure and "cmHg"(centimeters Mercury column) for the vacuum scale, and the fourth position of switch 23 selects "Bar"(barometric increment) for pressure and "−Bar" for the vacuum scale.

Switch 24 is also a four-position rotary DIP switch used for selecting an alternation mode whereby the display alternates between two scales. The PSI scale and the Kpa scale can both be displayed by alternating the scale, every second, so in effect a dual scale that is familiar to the user can be incorporated into the display shown in FIG. 5. Switch 25 is an eight-position switch that is used for an offset adjustment. Each position offsets the reading, also at zero pressure, by one display resolution increment. If, for example, the display resolution was 0.1, then the effect on the reading for switch positions 1 through 8 would be: {−0.3, −0.2, −0.1, 0, +0.1, +0.2, +0.3, +0.4}. This function is commonly called a zero adjust.

Switch 27 is a factory-set switch that is used to configure the product. From one to four scales are preferably provided. Test gauges and high accuracy gauges would take advantage of improved accuracy and resolution by selecting only one or two scales having more data points in the look-up table. Switch 27 is preferably preset by the manufacturer prior to the assembly and calibration.

Method of Operation of the Preferred Embodiments

Switches 22, 23, 24 and 25 are shown in FIG. 3 to be binary-type rotary DIP switches. The switches are set up this way so that upon power up the configuration of the gauge is automatically set. The configuration is set in the mechanical positions of the switches.

External capacitor 28 is shown to provide a charge storage for driving the LCD 26. A data communication port, DATA, is included for downloading calibration look-up tables, as will now be described.

Figure 7:
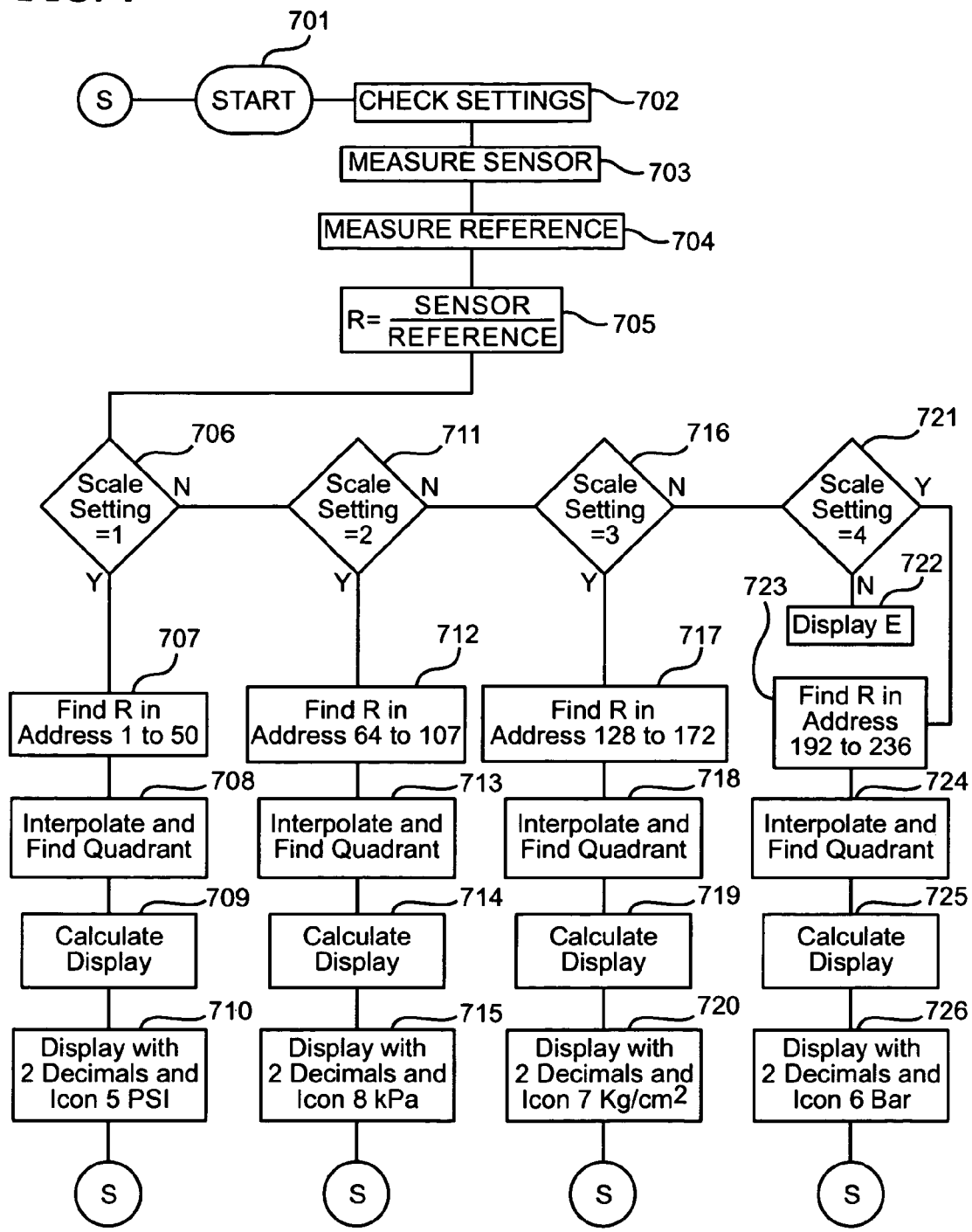
FIG. 7 is an operational flow chart of the measuring and display routine for the electric circuitry used in the present invention.

A key point is the conversion of the ratio-metric value, the ratio of the sensor capacitance to the reference capacitor, to the display value. A state machine that simply interpolates data and associates to a display value processes the measurement data. This method is demonstrated for a pressure gauge having four selectable units of measure with the aid of reference to Table 1 and the flow chart shown in FIG. 7.

The measurement and display routine starts (Block 701) with a setting check (Block 702), the settings select the scale, zero set and averaging of the readings. For simplicity, the zero set and averaging functions, known to a skilled instrument maker, are not described. Next, the capacitance of the sensor is measured (Block 703) using a technique previously described. The value may be a frequency count or a charge-discharge time. The reference is measured (Block 704) in the same manner. A ratio of the sensor and reference is calculated (Block 705). A decision to go to specific blocks of data is made depending on the scale select setting. If the scale setting is 1, then PSI scale is chosen (Block 706) and the block of data in the lookup table from address 0 to 50 is chosen (Block 707). Similarly, a scale setting of 2 results in the direction to find the ratio value in a block of data having an address between 64 to 107 for the Bar scale (Block 712). A ratio, for example of 22.250, would, by some method such as successive approximation, be between address 5 and 6 on the PSI scale, (see Table 1). Since the interpolation is specified in the table by a 4, an interpolation (Block 708) into four quartiles is made. 22.250 falls in the third quartile corresponding to a display of 575. With a 2 specified in the decimal data, the display calculation (Block 709) would be 8.75, and Icon 5 is also displayed (Block 710) showing that the 5.75 is PSI.

If the scale setting is 2, then the decision block (Block 711) directs the reading ratio to seek (Block 712) two addresses between 64 and 107 by the search technique described. Address 68 and 69 border the example reading ratio of 22.250 and a quartile interpolation (4 ways) puts the reading in the fourth quartile (Block 713) corresponding to a display of 40 with two decimal places (Block 714) and displays a reading of 0.4 with the Icon 8 Bar (Block 715) or commands the display to read 0.40 Bar.

If the scale switch setting is 3, then decision block (Block 716) directs the steps of Blocks 717, 718, 719 and 720 to calculate the value corresponding to the Kg/cm$^2$ scale, in a similar manner as previously described. Similarly, a switch setting of 4 is directed (Block 721) to calculate the reading by the steps Blocks 723, 724, 725 and 726 to display the reading in the Kpa scale, in a similar manner as previously described. An unknown switch setting is recognized (Block 722) and the routine returns to the routine start (Block 701) with an Err (Error) displayed.

TABLE 1

| Address | Sensor (pF) | Sensor/Ref pF Ratio | Display | Sign | Decimal | Icon | Interpolation |
|---|---|---|---|---|---|---|---|
| | | | 0 to 50 PSI | | | | |
| 0 | 20.000 | 0.800 | 000 | 1 | 2 | 5 | 4 |
| 1 | 20.400 | 0.816 | 100 | 1 | 2 | 5 | 4 |
| 2 | 20.800 | 0.832 | 200 | 1 | 2 | 5 | 4 |
| 3 | 21.200 | 0.848 | 300 | 1 | 2 | 5 | 4 |
| 4 | 21.600 | 0.864 | 400 | 1 | 2 | 5 | 4 |
| 5 | 22.000 | 0.880 | 500 | 1 | 2 | 5 | 4 |
| 6 | 22.400 | 0.896 | 600 | 1 | 2 | 5 | 4 |
| 7 | 22.800 | 0.912 | 700 | 1 | 2 | 5 | 4 |
| 8 | 23.200 | 0.928 | 800 | 1 | 2 | 5 | 4 |

TABLE 1-continued

| Address | Sensor (pF) | Sensor/Ref pF Ratio | Display | Sign | Decimal | Icon | Interpolation |
|---|---|---|---|---|---|---|---|
| 9 | 23.600 | 0.944 | 900 | 1 | 2 | 5 | 4 |
| 10 | 24.000 | 0.960 | 1000 | 1 | 2 | 5 | 4 |
| 11 | 24.400 | 0.976 | 1100 | 1 | 2 | 5 | 4 |
| 12 | 24.800 | 0.992 | 1200 | 1 | 2 | 5 | 4 |
| 13 | 25.200 | 1.008 | 1300 | 1 | 2 | 5 | 4 |
| 14 | 25.600 | 1.024 | 1400 | 1 | 2 | 5 | 4 |
| 15 | 26.000 | 1.040 | 1500 | 1 | 2 | 5 | 4 |
| 16 | 26.400 | 1.056 | 1600 | 1 | 2 | 5 | 4 |
| 17 | 26.800 | 1.072 | 1700 | 1 | 2 | 5 | 4 |
| 18 | 27.200 | 1.088 | 1800 | 1 | 2 | 5 | 4 |
| 19 | 27.600 | 1.104 | 1900 | 1 | 2 | 5 | 4 |
| 20 | 28.000 | 1.120 | 2000 | 1 | 2 | 5 | 4 |
| 21 | 28.400 | 1.136 | 2100 | 1 | 2 | 5 | 4 |
| 22 | 28.800 | 1.152 | 2200 | 1 | 2 | 5 | 4 |
| 23 | 29.200 | 1.168 | 2300 | 1 | 2 | 5 | 4 |
| 24 | 29.600 | 1.184 | 2400 | 1 | 2 | 5 | 4 |
| 25 | 30.000 | 1.200 | 2500 | 1 | 2 | 5 | 4 |
| 26 | 30.400 | 1.216 | 2600 | 1 | 2 | 5 | 4 |
| 27 | 30.800 | 1.232 | 2700 | 1 | 2 | 5 | 4 |
| 28 | 31.200 | 1.248 | 2800 | 1 | 2 | 5 | 4 |
| 29 | 31.600 | 1.264 | 2900 | 1 | 2 | 5 | 4 |
| 30 | 32.000 | 1.280 | 3000 | 1 | 2 | 5 | 4 |
| 31 | 32.400 | 1.296 | 3100 | 1 | 2 | 5 | 4 |
| 32 | 32.800 | 1.312 | 3200 | 1 | 2 | 5 | 4 |
| 33 | 33.200 | 1.328 | 3300 | 1 | 2 | 5 | 4 |
| 34 | 33.600 | 1.344 | 3400 | 1 | 2 | 5 | 4 |
| 35 | 34.000 | 1.360 | 3500 | 1 | 2 | 5 | 4 |
| 36 | 34.400 | 1.376 | 3600 | 1 | 2 | 5 | 4 |
| 37 | 34.800 | 1.392 | 3700 | 1 | 2 | 5 | 4 |
| 38 | 35.200 | 1.408 | 3800 | 1 | 2 | 5 | 4 |
| 39 | 35.600 | 1.424 | 3900 | 1 | 2 | 5 | 4 |
| 40 | 36.000 | 1.440 | 4000 | 1 | 2 | 5 | 4 |
| 41 | 36.400 | 1.456 | 4100 | 1 | 2 | 5 | 4 |
| 42 | 36.800 | 1.472 | 4200 | 1 | 2 | 5 | 4 |
| 43 | 37.200 | 1.488 | 4300 | 1 | 2 | 5 | 4 |
| 44 | 37.600 | 1.504 | 4400 | 1 | 2 | 5 | 4 |
| 45 | 38.000 | 1.520 | 4500 | 1 | 2 | 5 | 4 |
| 46 | 38.400 | 1.536 | 4600 | 1 | 2 | 5 | 4 |
| 47 | 38.800 | 1.552 | 4700 | 1 | 2 | 5 | 4 |
| 48 | 39.200 | 1.568 | 4800 | 1 | 2 | 5 | 4 |
| 49 | 39.600 | 1.584 | 4900 | 1 | 2 | 5 | 4 |
| 50 | 40.000 | 1.600 | 5000 | 1 | 2 | 5 | 4 |
| | | | 0 to 3.4 Bar | | | | |
| 64 | 20.000 | 0.800 | 00 | 1 | 2 | 8 | 4 |
| 65 | 20.470 | 0.819 | 08 | 1 | 2 | 8 | 4 |
| 66 | 20.940 | 0.838 | 16 | 1 | 2 | 8 | 4 |
| 67 | 21.411 | 0.856 | 24 | 1 | 2 | 8 | 4 |
| 68 | 21.881 | 0.875 | 32 | 1 | 2 | 8 | 4 |
| 69 | 22.351 | 0.894 | 40 | 1 | 2 | 8 | 4 |
| 70 | 22.821 | 0.913 | 48 | 1 | 2 | 8 | 4 |
| 71 | 23.292 | 0.932 | 56 | 1 | 2 | 8 | 4 |
| 72 | 23.762 | 0.950 | 64 | 1 | 2 | 8 | 4 |
| 73 | 24.232 | 0.969 | 72 | 1 | 2 | 8 | 4 |
| 74 | 24.702 | 0.988 | 80 | 1 | 2 | 8 | 4 |
| 75 | 25.173 | 1.007 | 88 | 1 | 2 | 8 | 4 |
| 76 | 25.643 | 1.026 | 96 | 1 | 2 | 8 | 4 |
| 77 | 26.113 | 1.045 | 104 | 1 | 2 | 8 | 4 |
| 78 | 26.583 | 1.063 | 112 | 1 | 2 | 8 | 4 |
| 79 | 27.053 | 1.082 | 120 | 1 | 2 | 8 | 4 |
| 80 | 27.524 | 1.101 | 128 | 1 | 2 | 8 | 4 |
| 81 | 27.994 | 1.120 | 136 | 1 | 2 | 8 | 4 |
| 82 | 28.464 | 1.139 | 144 | 1 | 2 | 8 | 4 |
| 83 | 28.934 | 1.157 | 152 | 1 | 2 | 8 | 4 |
| 84 | 29.405 | 1.176 | 160 | 1 | 2 | 8 | 4 |
| 85 | 29.875 | 1.195 | 168 | 1 | 2 | 8 | 4 |
| 86 | 30.345 | 1.214 | 176 | 1 | 2 | 8 | 4 |
| 87 | 30.815 | 1.233 | 184 | 1 | 2 | 8 | 4 |
| 88 | 31.286 | 1.251 | 192 | 1 | 2 | 8 | 4 |
| 89 | 31.756 | 1.270 | 200 | 1 | 2 | 8 | 4 |
| 90 | 32.226 | 1.289 | 208 | 1 | 2 | 8 | 4 |
| 91 | 32.696 | 1.308 | 216 | 1 | 2 | 8 | 4 |
| 92 | 33.167 | 1.327 | 224 | 1 | 2 | 8 | 4 |
| 93 | 33.637 | 1.345 | 232 | 1 | 2 | 8 | 4 |
| 94 | 34.107 | 1.364 | 240 | 1 | 2 | 8 | 4 |
| 95 | 34.577 | 1.383 | 248 | 1 | 2 | 8 | 4 |

TABLE 1-continued

| Address | Sensor (pF) | Sensor/Ref pF Ratio | Display | Sign | Decimal | Icon | Interpolation |
|---|---|---|---|---|---|---|---|
| 96 | 35.047 | 1.402 | 256 | 1 | 2 | 8 | 4 |
| 97 | 35.518 | 1.421 | 264 | 1 | 2 | 8 | 4 |
| 98 | 35.988 | 1.440 | 272 | 1 | 2 | 8 | 4 |
| 99 | 36.458 | 1.458 | 280 | 1 | 2 | 8 | 4 |
| 100 | 36.928 | 1.477 | 288 | 1 | 2 | 8 | 4 |
| 101 | 37.399 | 1.496 | 296 | 1 | 2 | 8 | 4 |
| 102 | 37.869 | 1.515 | 304 | 1 | 2 | 8 | 4 |
| 103 | 38.339 | 1.534 | 312 | 1 | 2 | 8 | 4 |
| 104 | 38.809 | 1.552 | 320 | 1 | 2 | 8 | 4 |
| 105 | 39.280 | 1.571 | 328 | 1 | 2 | 8 | 4 |
| 106 | 39.750 | 1.590 | 336 | 1 | 2 | 8 | 4 |
| 107 | 40.220 | 1.609 | 344 | 1 | 2 | 8 | 4 |
| 0 to 3.5 Kg/cm$^2$ | | | | | | | |
| 128 | 20.000 | 0.800 | 00 | 1 | 2 | 7 | 4 |
| 129 | 20.455 | 0.818 | 08 | 1 | 2 | 7 | 4 |
| 130 | 20.910 | 0.836 | 16 | 1 | 2 | 7 | 4 |
| 131 | 21.365 | 0.855 | 24 | 1 | 2 | 7 | 4 |
| 132 | 21.820 | 0.873 | 32 | 1 | 2 | 7 | 4 |
| 133 | 22.276 | 0.891 | 40 | 1 | 2 | 7 | 4 |
| 134 | 22.731 | 0.909 | 48 | 1 | 2 | 7 | 4 |
| 135 | 23.186 | 0.927 | 56 | 1 | 2 | 7 | 4 |
| 136 | 23.641 | 0.946 | 64 | 1 | 2 | 7 | 4 |
| 137 | 24.096 | 0.964 | 72 | 1 | 2 | 7 | 4 |
| 138 | 24.551 | 0.982 | 80 | 1 | 2 | 7 | 4 |
| 139 | 25.006 | 1.000 | 88 | 1 | 2 | 7 | 4 |
| 140 | 25.461 | 1.018 | 96 | 1 | 2 | 7 | 4 |
| 141 | 25.916 | 1.037 | 104 | 1 | 2 | 7 | 4 |
| 142 | 26.371 | 1.055 | 112 | 1 | 2 | 7 | 4 |
| 143 | 26.827 | 1.073 | 120 | 1 | 2 | 7 | 4 |
| 144 | 27.282 | 1.091 | 128 | 1 | 2 | 7 | 4 |
| 145 | 27.737 | 1.109 | 136 | 1 | 2 | 7 | 4 |
| 146 | 28.192 | 1.128 | 144 | 1 | 2 | 7 | 4 |
| 147 | 28.647 | 1.146 | 152 | 1 | 2 | 7 | 4 |
| 148 | 29.102 | 1.164 | 160 | 1 | 2 | 7 | 4 |
| 149 | 29.557 | 1.182 | 168 | 1 | 2 | 7 | 4 |
| 150 | 30.012 | 1.200 | 176 | 1 | 2 | 7 | 4 |
| 151 | 30.467 | 1.219 | 184 | 1 | 2 | 7 | 4 |
| 152 | 30.922 | 1.237 | 192 | 1 | 2 | 7 | 4 |
| 153 | 31.378 | 1.255 | 200 | 1 | 2 | 7 | 4 |
| 154 | 31.833 | 1.273 | 208 | 1 | 2 | 7 | 4 |
| 155 | 32.288 | 1.292 | 216 | 1 | 2 | 7 | 4 |
| 156 | 32.743 | 1.310 | 224 | 1 | 2 | 7 | 4 |
| 157 | 33.198 | 1.328 | 232 | 1 | 2 | 7 | 4 |
| 158 | 33.653 | 1.346 | 240 | 1 | 2 | 7 | 4 |
| 159 | 34.108 | 1.364 | 248 | 1 | 2 | 7 | 4 |
| 160 | 34.563 | 1.383 | 256 | 1 | 2 | 7 | 4 |
| 161 | 35.018 | 1.401 | 264 | 1 | 2 | 7 | 4 |
| 162 | 35.473 | 1.419 | 272 | 1 | 2 | 7 | 4 |
| 163 | 35.929 | 1.437 | 280 | 1 | 2 | 7 | 4 |
| 164 | 36.384 | 1.455 | 288 | 1 | 2 | 7 | 4 |
| 165 | 36.839 | 1.474 | 296 | 1 | 2 | 7 | 4 |
| 166 | 37.294 | 1.492 | 304 | 1 | 2 | 7 | 4 |
| 167 | 37.749 | 1.510 | 312 | 1 | 2 | 7 | 4 |
| 168 | 38.204 | 1.528 | 320 | 1 | 2 | 7 | 4 |
| 169 | 38.659 | 1.546 | 328 | 1 | 2 | 7 | 4 |
| 170 | 39.114 | 1.565 | 336 | 1 | 2 | 7 | 4 |
| 171 | 39.569 | 1.583 | 344 | 1 | 2 | 7 | 4 |
| 172 | 40.024 | 1.601 | 352 | 1 | 2 | 7 | 4 |
| 0 to 350 KPa | | | | | | | |
| 192 | 20.000 | 0.800 | 0 | 1 | 0 | 6 | 4 |
| 193 | 20.464 | 0.819 | 8 | 1 | 0 | 6 | 4 |
| 194 | 20.928 | 0.837 | 16 | 1 | 0 | 6 | 4 |
| 195 | 21.392 | 0.856 | 24 | 1 | 0 | 6 | 4 |
| 196 | 21.856 | 0.874 | 32 | 1 | 0 | 6 | 4 |
| 197 | 22.321 | 0.893 | 40 | 1 | 0 | 6 | 4 |
| 198 | 22.785 | 0.911 | 48 | 1 | 0 | 6 | 4 |
| 199 | 23.249 | 0.930 | 56 | 1 | 0 | 6 | 4 |
| 200 | 23.713 | 0.949 | 64 | 1 | 0 | 6 | 4 |
| 201 | 24.177 | 0.967 | 72 | 1 | 0 | 6 | 4 |
| 202 | 24.641 | 0.986 | 80 | 1 | 0 | 6 | 4 |
| 203 | 25.105 | 1.004 | 88 | 1 | 0 | 6 | 4 |
| 204 | 25.569 | 1.023 | 96 | 1 | 0 | 6 | 4 |
| 205 | 26.033 | 1.041 | 104 | 1 | 0 | 6 | 4 |
| 206 | 26.497 | 1.060 | 112 | 1 | 0 | 6 | 4 |

TABLE 1-continued

| Address | Sensor (pF) | Sensor/Ref pF Ratio | Display | Sign | Decimal | Icon | Interpolation |
|---|---|---|---|---|---|---|---|
| 207 | 26.962 | 1.078 | 120 | 1 | 0 | 6 | 4 |
| 208 | 27.426 | 1.097 | 128 | 1 | 0 | 6 | 4 |
| 209 | 27.890 | 1.116 | 136 | 1 | 0 | 6 | 4 |
| 210 | 28.354 | 1.134 | 144 | 1 | 0 | 6 | 4 |
| 211 | 28.818 | 1.153 | 152 | 1 | 0 | 6 | 4 |
| 212 | 29.282 | 1.171 | 160 | 1 | 0 | 6 | 4 |
| 213 | 29.746 | 1.190 | 168 | 1 | 0 | 6 | 4 |
| 214 | 30.210 | 1.208 | 176 | 1 | 0 | 6 | 4 |
| 215 | 30.674 | 1.227 | 184 | 1 | 0 | 6 | 4 |
| 216 | 31.138 | 1.246 | 192 | 1 | 0 | 6 | 4 |
| 217 | 31.603 | 1.264 | 200 | 1 | 0 | 6 | 4 |
| 218 | 32.067 | 1.283 | 208 | 1 | 0 | 6 | 4 |
| 219 | 32.531 | 1.301 | 216 | 1 | 0 | 6 | 4 |
| 220 | 32.995 | 1.320 | 224 | 1 | 0 | 6 | 4 |
| 221 | 33.459 | 1.338 | 232 | 1 | 0 | 6 | 4 |
| 222 | 33.923 | 1.357 | 240 | 1 | 0 | 6 | 4 |
| 223 | 34.387 | 1.375 | 248 | 1 | 0 | 6 | 4 |
| 224 | 34.851 | 1.394 | 256 | 1 | 0 | 6 | 4 |
| 225 | 35.315 | 1.413 | 264 | 1 | 0 | 6 | 4 |
| 226 | 35.779 | 1.431 | 272 | 1 | 0 | 6 | 4 |
| 227 | 36.244 | 1.450 | 280 | 1 | 0 | 6 | 4 |
| 228 | 36.708 | 1.468 | 288 | 1 | 0 | 6 | 4 |
| 229 | 37.172 | 1.487 | 296 | 1 | 0 | 6 | 4 |
| 230 | 37.636 | 1.505 | 304 | 1 | 0 | 6 | 4 |
| 231 | 38.100 | 1.524 | 312 | 1 | 0 | 6 | 4 |
| 232 | 38.564 | 1.543 | 320 | 1 | 0 | 6 | 4 |
| 233 | 39.028 | 1.561 | 328 | 1 | 0 | 6 | 4 |
| 234 | 39.492 | 1.580 | 336 | 1 | 0 | 6 | 4 |
| 235 | 39.956 | 1.598 | 344 | 1 | 0 | 6 | 4 |
| 236 | 40.420 | 1.617 | 352 | 1 | 0 | 6 | 4 |

Table 1 is divided by addresses into four blocks for each of four selectable units of measure. The address block from 0 to 50 contain the data and display values for the pressure range of 0 to 50 PSI, the block of addresses from 64 to 107 contain the data for the pressure range of 0 to 3.44 Bar, addresses 128 to 172 contain the display and data for the 0 to 3.52 Kg/cm$^2$ and the addresses 192 to 236 contain the display and data for the 0 to 352 KPa scale. The data shown does not include data for pressures beyond the stated range. In actual cases, this data may be included and flagged to signify that the pressure is above the rated top of the range. This flag may be a separate icon or the letters "HH" in alternation displayed to warn the user that the pressures are higher than the rating. For data that is beyond the block allotted for the scale, the display would read HH only.

The fields in the look-up table include the data, shown here as the sensor capacitance ratio to the known reference capacitor, the display, a 14 bit number that corresponds to the characters on the display (0 to 9999), a one bit field for the sign, a two bit field for the number of decimal places, a three bit field to designate an icon on the display that corresponds to the units of measure, and a three bit field that specifies the number of interpolations to make on the data and display fields. If the sensor capacitance change is more linear, the number of addresses can be less and the interpolations between addresses can be more. The data array of non-volatile memory is reduced in capacity and cost by the nearly linear capacitance change. Fewer linear spring elements that have a greater travel are also suited for the calibration method herein described. The data can also be the ratio of the reference to the sensor capacitance or a digital number that corresponds to the ratio this number is associated with. A timer can be employed to count the reference and sensor capacitors' discharge time to a known voltage. In this case, the conversion from capacitance to digital is with a precise count. The display values shown are multiples of the desired display resolution. For example, the display values for the first two addresses on the PSI scale are 0 and 1 with 4 interpolations. The display resolution becomes 0.25 PSI. A gradual pressure rise from zero pressure will result in the display to read 0.00, 0.25, 0.50, 0.75, 1.00, 1.25, 1.50, 1.75, 2.00 . . . 50.00 PSI, as shown in FIG. 5a. The incremental pressure rise on the Bar scale becomes 0.00, 0.02, 0.04, 0.06, 0.08, 0.10, 0.12, 0.14, . . . 3.44 Bar. The PSI is displayed as the icon 52 and the Bar is displayed as a result of the icon 54 specified in the icon field. Similar display resolution progressions are made for the Kg/cm$^2$ and KPa scales. For compound ranges, not shown in this table, the vacuum units of measure are determined by the designation of the sign and the icon field. For example, below zero pressure, the vacuum units of measure that correspond to the PSI pressure scale would be inHg (inches of Mercury vacuum) and the sign would be negative, the lookup table would have a 0 in the sign field, and the lookup table would contain a 5 in the icon field corresponding to the inHg icon as shown in FIG. 5.

Referring to FIG. 5, the pressure icons are arranged on the right side of the four digit numeric display and the vacuum icons are arranged on the left side of the numeric display. The LCD display of FIG. 5 shows all segments activated, including the pressure and vacuum icons, upon power up. It is desirable to activate all display segments as a display function test. FIG. 5a shows in a series of displays the incremental change of the display with a slowly rising pressure when the gauge is set for the PSI scale. The display value incrementally increases by the predetermined resolution increment. Each measurement cycle compares the capacitance data to a higher and lower value in the look-up table and interpolates according to the interpolation field. In this case, a quartile interpolation is made on the data and the reverse quartile interpolation is made on the display data to arrive at the display reading value. The interpolations are easily performed by bit shifting the data in the binary format. No additional calculations are needed, and quick, efficient conversions are made. A calibration device calculates the capacitance data for all addresses in the table from the characteristic curve derived from measuring a few points during a calibration procedure. The table is then downloaded to the non-volatile memory location within the integrated circuit to construct the look-up table. The data shown in Table 1 is linear; however, it is understood that non-linear curve fitting can be used to build the look-up table as well. The calibration device can be a simple PC (personal computer) with a communication device to transfer the entire table to the non-volatile memory by RS232 or similar communication protocol.

Figure 6:
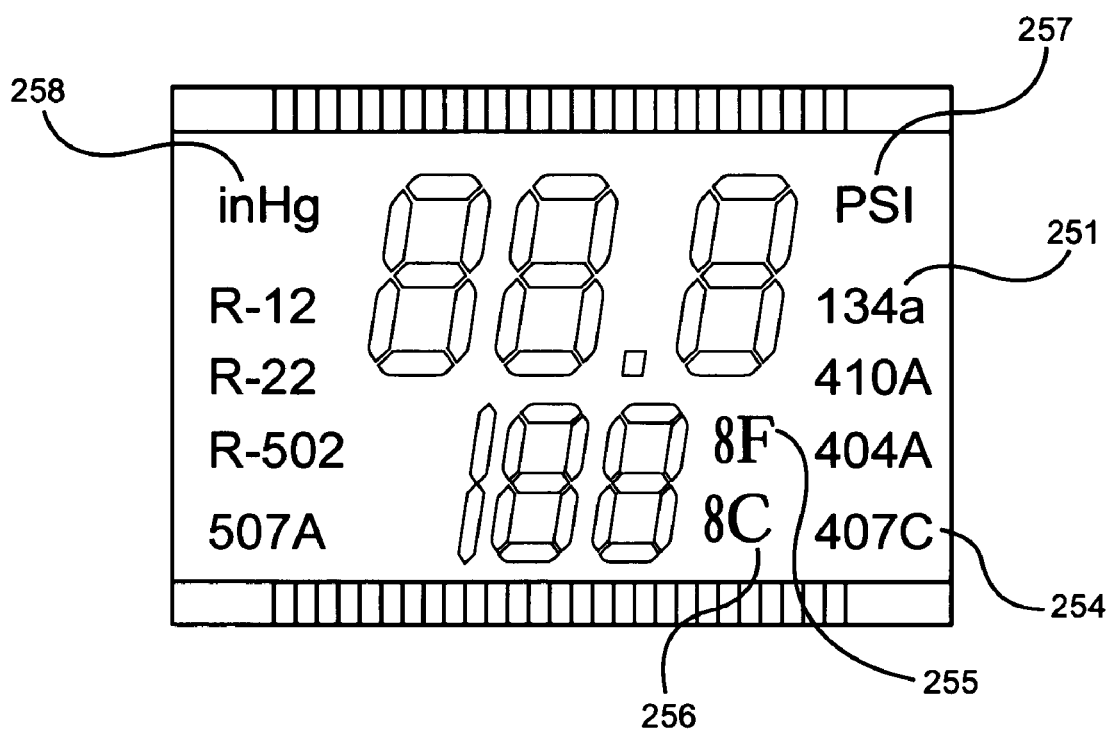
FIG. 6 is a front view of the LCD display of a refrigeration gauge of the present invention.

By the use of the technique mentioned above, the present invention is configurable to many pressure measurement products, that is, pressure, vacuum, compound and refrigeration gauges, with one, two or four separate scales and a variety of pressure ranges. For the refrigeration gauge, the display is configured to show two blocks of data, one corresponding to the pressure and one corresponding to the temperature of a particular refrigerant at that vapor pressure (see FIG. 6). The table treats the temperature scale as another unit of measure that corresponds to a particular refrigerant selected by the rotary switch 23 of FIG. 4. The corresponding icon that signifies the refrigerant used is displayed. If the switch is in position 5, for example, the refrigerant 134a is selected and the icon 251 is shown on the display. Alternatively, if the selector switch 23 is in the eighth position, the data corresponding to the refrigerant 407C is selected and the icon 254 is displayed. The sensor measures the pressure, and the display shows both the pressure and the corresponding vapor temperature for that refrigerant at the measured pressure. When a refrigeration system is filled, a vacuum is drawn to remove the air. During this time, the pressure display will be in the vacuum units, in this case inHg 258 is displayed. As the refrigerant is introduced, the pressure goes higher and once out of the vacuum realm, the pressure icon PSI 257 is displayed. A separate switch, not shown, is used to set the temperature scale to either ° C. or ° F.

Capacitive sensors for other devices, such as hydrometers and weight scales, can be combined with this measuring system to make extremely low power products that can operate with room light as a power source or with a long life battery for many years of use.

Table 2 shows a look-up table for a bathroom scale, formed in accordance with the present invention, that uses a capacitive force sensor having an inverse non-linear relation between capacitance and force. It is noted that this is similar to the inverse relation of the pressure to capacitance sensor described by the second preferred embodiment. In this case, two units of measure are preferably defined, that is, pounds and kilograms.

Table 2 is constructed to have a variable resolution from 0 to 160 lbs. The sensor capacitance change is non-linear, as with the separation of two parallel plates. The display increment change is 16 with 1 decimal place, 0.16, and the interpolation is by 8 so that the resolution becomes 0.2 lbs. By the same means, the resolution is 0.5 lbs between 160 lbs. and 228 lbs. and 1 lb between 228 lbs. and 316 lbs. This ability to change the resolution as the scale expands is also important for pressure gauges, especially for the refrigeration gauge previously described having a scale that corresponds to the temperature associated with the saturation vapor pressure of a particular refrigerant, and several refrigerants can be incorporated in the same gauge by the above method of partitioning the look-up table. The pound (lb.) scale table provides over-range data up to 316 lbs. The Kilogram scale, described in Table 2 from address 128 to 256, is also constructed to have a variable resolution and over-range data.

TABLE 2

| Address | Data (pF) | Sensor/Ref pF Ratio | Display | Sign | Decimal | Icon | Interpolation | Resolution |
|---|---|---|---|---|---|---|---|---|
| | | | 0–300 lbs. | | | | | |
| 0 | 28.980 | 1.159 | 00 | 1 | 1 | 1 | 8 | 0.2 Lb |
| 1 | 28.858 | 1.154 | 16 | 1 | 1 | 1 | 8 | 0.2 Lb |
| 2 | 28.737 | 1.149 | 32 | 1 | 1 | 1 | 8 | 0.2 Lb |
| 3 | 28.617 | 1.145 | 48 | 1 | 1 | 1 | 8 | 0.2 Lb |
| 4 | 28.498 | 1.140 | 64 | 1 | 1 | 1 | 8 | 0.2 Lb |
| 5 | 28.379 | 1.135 | 80 | 1 | 1 | 1 | 8 | 0.2 Lb |
| 6 | 28.261 | 1.130 | 96 | 1 | 1 | 1 | 8 | 0.2 Lb |
| 7 | 28.145 | 1.126 | 112 | 1 | 1 | 1 | 8 | 0.2 Lb |
| 8 | 28.029 | 1.121 | 128 | 1 | 1 | 1 | 8 | 0.2 Lb |
| 9 | 27.914 | 1.117 | 144 | 1 | 1 | 1 | 8 | 0.2 Lb |
| 10 | 27.800 | 1.112 | 160 | 1 | 1 | 1 | 8 | 0.2 Lb |
| 11 | 27.686 | 1.107 | 176 | 1 | 1 | 1 | 8 | 0.2 Lb |
| 12 | 27.574 | 1.103 | 192 | 1 | 1 | 1 | 8 | 0.2 Lb |
| 13 | 27.462 | 1.098 | 208 | 1 | 1 | 1 | 8 | 0.2 Lb |
| 14 | 27.351 | 1.094 | 224 | 1 | 1 | 1 | 8 | 0.2 Lb |
| 15 | 27.241 | 1.090 | 240 | 1 | 1 | 1 | 8 | 0.2 Lb |
| 16 | 27.132 | 1.085 | 256 | 1 | 1 | 1 | 8 | 0.2 Lb |
| 17 | 27.024 | 1.081 | 272 | 1 | 1 | 1 | 8 | 0.2 Lb |
| 18 | 26.916 | 1.077 | 288 | 1 | 1 | 1 | 8 | 0.2 Lb |
| 19 | 26.809 | 1.072 | 304 | 1 | 1 | 1 | 8 | 0.2 Lb |
| 20 | 26.703 | 1.068 | 320 | 1 | 1 | 1 | 8 | 0.2 Lb |
| 21 | 26.598 | 1.064 | 336 | 1 | 1 | 1 | 8 | 0.2 Lb |
| 22 | 26.494 | 1.060 | 352 | 1 | 1 | 1 | 8 | 0.2 Lb |
| 23 | 26.390 | 1.056 | 368 | 1 | 1 | 1 | 8 | 0.2 Lb |
| 24 | 26.287 | 1.051 | 384 | 1 | 1 | 1 | 8 | 0.2 Lb |
| 25 | 26.185 | 1.047 | 400 | 1 | 1 | 1 | 8 | 0.2 Lb |
| 26 | 26.084 | 1.043 | 416 | 1 | 1 | 1 | 8 | 0.2 Lb |

TABLE 2-continued

| Address | Data (pF) | Sensor/Ref pF Ratio | Display | Sign | Decimal | Icon | Interpolation | Resolution | |
|---|---|---|---|---|---|---|---|---|---|
| 27 | 25.984 | 1.039 | 432 | 1 | 1 | 1 | 8 | 0.2 | Lb |
| 28 | 25.884 | 1.035 | 448 | 1 | 1 | 1 | 8 | 0.2 | Lb |
| 29 | 25.785 | 1.031 | 464 | 1 | 1 | 1 | 8 | 0.2 | Lb |
| 30 | 25.687 | 1.027 | 480 | 1 | 1 | 1 | 8 | 0.2 | Lb |
| 31 | 25.589 | 1.024 | 496 | 1 | 1 | 1 | 8 | 0.2 | Lb |
| 32 | 25.492 | 1.020 | 512 | 1 | 1 | 1 | 8 | 0.2 | Lb |
| 33 | 25.396 | 1.016 | 528 | 1 | 1 | 1 | 8 | 0.2 | Lb |
| 34 | 25.301 | 1.012 | 544 | 1 | 1 | 1 | 8 | 0.2 | Lb |
| 35 | 25.206 | 1.008 | 560 | 1 | 1 | 1 | 8 | 0.2 | Lb |
| 36 | 25.113 | 1.005 | 576 | 1 | 1 | 1 | 8 | 0.2 | Lb |
| 37 | 25.019 | 1.001 | 592 | 1 | 1 | 1 | 8 | 0.2 | Lb |
| 38 | 24.927 | 0.997 | 608 | 1 | 1 | 1 | 8 | 0.2 | Lb |
| 39 | 24.835 | 0.993 | 624 | 1 | 1 | 1 | 8 | 0.2 | Lb |
| 40 | 24.744 | 0.990 | 640 | 1 | 1 | 1 | 8 | 0.2 | Lb |
| 41 | 24.654 | 0.986 | 656 | 1 | 1 | 1 | 8 | 0.2 | Lb |
| 42 | 24.564 | 0.983 | 672 | 1 | 1 | 1 | 8 | 0.2 | Lb |
| 43 | 24.475 | 0.979 | 688 | 1 | 1 | 1 | 8 | 0.2 | Lb |
| 44 | 24.387 | 0.975 | 704 | 1 | 1 | 1 | 8 | 0.2 | Lb |
| 45 | 24.299 | 0.972 | 720 | 1 | 1 | 1 | 8 | 0.2 | Lb |
| 46 | 24.212 | 0.968 | 736 | 1 | 1 | 1 | 8 | 0.2 | Lb |
| 47 | 24.126 | 0.965 | 752 | 1 | 1 | 1 | 8 | 0.2 | Lb |
| 48 | 24.040 | 0.962 | 768 | 1 | 1 | 1 | 8 | 0.2 | Lb |
| 49 | 23.956 | 0.958 | 784 | 1 | 1 | 1 | 8 | 0.2 | Lb |
| 50 | 23.871 | 0.955 | 800 | 1 | 1 | 1 | 8 | 0.2 | Lb |
| 51 | 23.788 | 0.952 | 816 | 1 | 1 | 1 | 8 | 0.2 | Lb |
| 52 | 23.704 | 0.948 | 832 | 1 | 1 | 1 | 8 | 0.2 | Lb |
| 53 | 23.622 | 0.945 | 848 | 1 | 1 | 1 | 8 | 0.2 | Lb |
| 54 | 23.540 | 0.942 | 864 | 1 | 1 | 1 | 8 | 0.2 | Lb |
| 55 | 23.459 | 0.938 | 880 | 1 | 1 | 1 | 8 | 0.2 | Lb |
| 56 | 23.379 | 0.935 | 896 | 1 | 1 | 1 | 8 | 0.2 | Lb |
| 57 | 23.299 | 0.932 | 912 | 1 | 1 | 1 | 8 | 0.2 | Lb |
| 58 | 23.219 | 0.929 | 928 | 1 | 1 | 1 | 8 | 0.2 | Lb |
| 59 | 23.141 | 0.926 | 944 | 1 | 1 | 1 | 8 | 0.2 | Lb |
| 60 | 23.062 | 0.922 | 960 | 1 | 1 | 1 | 8 | 0.2 | Lb |
| 61 | 22.985 | 0.919 | 976 | 1 | 1 | 1 | 8 | 0.2 | Lb |
| 62 | 22.908 | 0.916 | 992 | 1 | 1 | 1 | 8 | 0.2 | Lb |
| 63 | 22.832 | 0.913 | 1008 | 1 | 1 | 1 | 8 | 0.2 | Lb |
| 64 | 22.756 | 0.910 | 1024 | 1 | 1 | 1 | 8 | 0.2 | Lb |
| 65 | 22.681 | 0.907 | 1040 | 1 | 1 | 1 | 8 | 0.2 | Lb |
| 66 | 22.606 | 0.904 | 1056 | 1 | 1 | 1 | 8 | 0.2 | Lb |
| 67 | 22.532 | 0.901 | 1072 | 1 | 1 | 1 | 8 | 0.2 | Lb |
| 68 | 22.458 | 0.898 | 1088 | 1 | 1 | 1 | 8 | 0.2 | Lb |
| 69 | 22.385 | 0.895 | 1104 | 1 | 1 | 1 | 8 | 0.2 | Lb |
| 70 | 22.313 | 0.893 | 1120 | 1 | 1 | 1 | 8 | 0.2 | Lb |
| 71 | 22.241 | 0.890 | 1136 | 1 | 1 | 1 | 8 | 0.2 | Lb |
| 72 | 22.170 | 0.887 | 1152 | 1 | 1 | 1 | 8 | 0.2 | Lb |
| 73 | 22.099 | 0.884 | 1168 | 1 | 1 | 1 | 8 | 0.2 | Lb |
| 74 | 22.029 | 0.881 | 1184 | 1 | 1 | 1 | 8 | 0.2 | Lb |
| 75 | 21.959 | 0.878 | 1200 | 1 | 1 | 1 | 8 | 0.2 | Lb |
| 76 | 21.890 | 0.876 | 1216 | 1 | 1 | 1 | 8 | 0.2 | Lb |
| 77 | 21.821 | 0.873 | 1232 | 1 | 1 | 1 | 8 | 0.2 | Lb |
| 78 | 21.753 | 0.870 | 1248 | 1 | 1 | 1 | 8 | 0.2 | Lb |
| 79 | 21.685 | 0.867 | 1264 | 1 | 1 | 1 | 8 | 0.2 | Lb |
| 80 | 21.618 | 0.865 | 1280 | 1 | 1 | 1 | 8 | 0.2 | Lb |
| 81 | 21.551 | 0.862 | 1296 | 1 | 1 | 1 | 8 | 0.2 | Lb |
| 82 | 21.485 | 0.859 | 1312 | 1 | 1 | 1 | 8 | 0.2 | Lb |
| 83 | 21.419 | 0.857 | 1328 | 1 | 1 | 1 | 8 | 0.2 | Lb |
| 84 | 21.354 | 0.854 | 1344 | 1 | 1 | 1 | 8 | 0.2 | Lb |
| 85 | 21.289 | 0.852 | 1360 | 1 | 1 | 1 | 8 | 0.2 | Lb |
| 86 | 21.225 | 0.849 | 1376 | 1 | 1 | 1 | 8 | 0.2 | Lb |
| 87 | 21.161 | 0.846 | 1392 | 1 | 1 | 1 | 8 | 0.2 | Lb |
| 88 | 21.097 | 0.844 | 1408 | 1 | 1 | 1 | 8 | 0.2 | Lb |
| 89 | 21.034 | 0.841 | 1424 | 1 | 1 | 1 | 8 | 0.2 | Lb |
| 90 | 20.972 | 0.839 | 1440 | 1 | 1 | 1 | 8 | 0.2 | Lb |
| 91 | 20.910 | 0.836 | 1456 | 1 | 1 | 1 | 8 | 0.2 | Lb |
| 92 | 20.848 | 0.834 | 1472 | 1 | 1 | 1 | 8 | 0.2 | Lb |
| 93 | 20.787 | 0.831 | 1488 | 1 | 1 | 1 | 8 | 0.2 | Lb |
| 94 | 20.726 | 0.829 | 1504 | 1 | 1 | 1 | 8 | 0.2 | Lb |
| 95 | 20.665 | 0.827 | 1520 | 1 | 1 | 1 | 8 | 0.2 | Lb |
| 96 | 20.606 | 0.824 | 1536 | 1 | 1 | 1 | 8 | 0.2 | Lb |
| 97 | 20.546 | 0.822 | 1552 | 1 | 1 | 1 | 8 | 0.2 | Lb |
| 98 | 20.487 | 0.819 | 1568 | 1 | 1 | 1 | 8 | 0.2 | Lb |
| 99 | 20.428 | 0.817 | 1584 | 1 | 1 | 1 | 8 | 0.2 | Lb |
| 100 | 20.370 | 0.815 | 1600 | 1 | 1 | 1 | 8 | 0.2 | Lb |
| 101 | 20.225 | 0.809 | 1640 | 1 | 1 | 1 | 8 | 0.5 | Lb |
| 102 | 20.084 | 0.803 | 1680 | 1 | 1 | 1 | 8 | 0.5 | Lb |

TABLE 2-continued

| Address | Data (pF) | Sensor/Ref pF Ratio | Display | Sign | Decimal | Icon | Interpolation | Resolution | |
|---|---|---|---|---|---|---|---|---|---|
| 103 | 19.944 | 0.798 | 1720 | 1 | 1 | 1 | 8 | 0.5 | Lb |
| 104 | 19.807 | 0.792 | 1760 | 1 | 1 | 1 | 8 | 0.5 | Lb |
| 105 | 19.671 | 0.787 | 1800 | 1 | 1 | 1 | 8 | 0.5 | Lb |
| 106 | 19.538 | 0.782 | 1840 | 1 | 1 | 1 | 8 | 0.5 | Lb |
| 107 | 19.407 | 0.776 | 1880 | 1 | 1 | 1 | 8 | 0.5 | Lb |
| 108 | 19.278 | 0.771 | 1920 | 1 | 1 | 1 | 8 | 0.5 | Lb |
| 109 | 19.150 | 0.766 | 1960 | 1 | 1 | 1 | 8 | 0.5 | Lb |
| 110 | 19.024 | 0.761 | 2000 | 1 | 1 | 1 | 8 | 0.5 | Lb |
| 111 | 18.900 | 0.756 | 2040 | 1 | 1 | 1 | 8 | 0.5 | Lb |
| 112 | 18.778 | 0.751 | 2080 | 1 | 1 | 1 | 8 | 0.5 | Lb |
| 113 | 18.657 | 0.746 | 2120 | 1 | 1 | 1 | 8 | 0.5 | Lb |
| 114 | 18.537 | 0.741 | 2160 | 1 | 1 | 1 | 8 | 0.5 | Lb |
| 115 | 18.419 | 0.737 | 2200 | 1 | 1 | 1 | 8 | 0.5 | Lb |
| 116 | 18.186 | 0.727 | 2280 | 1 | 1 | 1 | 8 | 0.5 | Lb |
| 117 | 17.957 | 0.718 | 2360 | 1 | 1 | 1 | 8 | 1.0 | Lb |
| 118 | 17.732 | 0.709 | 2440 | 1 | 1 | 1 | 8 | 1.0 | Lb |
| 119 | 17.510 | 0.700 | 2520 | 1 | 1 | 1 | 8 | 1.0 | Lb |
| 120 | 17.291 | 0.692 | 2600 | 1 | 1 | 1 | 8 | 1.0 | Lb |
| 121 | 17.074 | 0.683 | 2680 | 1 | 1 | 1 | 8 | 1.0 | Lb |
| 122 | 16.858 | 0.674 | 2760 | 1 | 1 | 1 | 8 | 1.0 | Lb |
| 123 | 16.642 | 0.666 | 2840 | 1 | 1 | 1 | 8 | 1.0 | Lb |
| 124 | 16.427 | 0.657 | 2920 | 1 | 1 | 1 | 8 | 1.0 | Lb |
| 125 | 16.210 | 0.648 | 3000 | 1 | 1 | 1 | 8 | 1.0 | Lb |
| 126 | 15.993 | 0.640 | 3080 | 1 | 1 | 1 | 8 | 1.0 | Lb |
| 127 | 15.774 | 0.631 | 3160 | 1 | 1 | 1 | 8 | 1.0 | Lb |
| | | | 0–140 Kg | | | | | | |
| 128 | 28.980 | 1.159 | 00 | 1 | 1 | 2 | 8 | 0.1 | Kg |
| 129 | 28.846 | 1.154 | 08 | 1 | 1 | 2 | 8 | 0.1 | Kg |
| 130 | 28.712 | 1.148 | 16 | 1 | 1 | 2 | 8 | 0.1 | Kg |
| 131 | 28.580 | 1.143 | 24 | 1 | 1 | 2 | 8 | 0.1 | Kg |
| 132 | 28.449 | 1.138 | 32 | 1 | 1 | 2 | 8 | 0.1 | Kg |
| 133 | 28.319 | 1.133 | 40 | 1 | 1 | 2 | 8 | 0.1 | Kg |
| 134 | 28.190 | 1.128 | 48 | 1 | 1 | 2 | 8 | 0.1 | Kg |
| 135 | 28.062 | 1.122 | 56 | 1 | 1 | 2 | 8 | 0.1 | Kg |
| 136 | 27.935 | 1.117 | 64 | 1 | 1 | 2 | 8 | 0.1 | Kg |
| 137 | 27.809 | 1.112 | 72 | 1 | 1 | 2 | 8 | 0.1 | Kg |
| 138 | 27.684 | 1.107 | 80 | 1 | 1 | 2 | 8 | 0.1 | Kg |
| 139 | 27.560 | 1.102 | 88 | 1 | 1 | 2 | 8 | 0.1 | Kg |
| 140 | 27.437 | 1.097 | 96 | 1 | 1 | 2 | 8 | 0.1 | Kg |
| 141 | 27.315 | 1.093 | 104 | 1 | 1 | 2 | 8 | 0.1 | Kg |
| 142 | 27.194 | 1.088 | 112 | 1 | 1 | 2 | 8 | 0.1 | Kg |
| 143 | 27.074 | 1.083 | 120 | 1 | 1 | 2 | 8 | 0.1 | Kg |
| 144 | 26.955 | 1.078 | 128 | 1 | 1 | 2 | 8 | 0.1 | Kg |
| 145 | 26.837 | 1.073 | 136 | 1 | 1 | 2 | 8 | 0.1 | Kg |
| 146 | 26.720 | 1.069 | 144 | 1 | 1 | 2 | 8 | 0.1 | Kg |
| 147 | 26.604 | 1.064 | 152 | 1 | 1 | 2 | 8 | 0.1 | Kg |
| 148 | 26.489 | 1.060 | 160 | 1 | 1 | 2 | 8 | 0.1 | Kg |
| 149 | 26.375 | 1.055 | 168 | 1 | 1 | 2 | 8 | 0.1 | Kg |
| 150 | 26.262 | 1.050 | 176 | 1 | 1 | 2 | 8 | 0.1 | Kg |
| 151 | 26.149 | 1.046 | 184 | 1 | 1 | 2 | 8 | 0.1 | Kg |
| 152 | 26.038 | 1.042 | 192 | 1 | 1 | 2 | 8 | 0.1 | Kg |
| 153 | 25.928 | 1.037 | 200 | 1 | 1 | 2 | 8 | 0.1 | Kg |
| 154 | 25.818 | 1.033 | 208 | 1 | 1 | 2 | 8 | 0.1 | Kg |
| 155 | 25.710 | 1.028 | 216 | 1 | 1 | 2 | 8 | 0.1 | Kg |
| 156 | 25.602 | 1.024 | 224 | 1 | 1 | 2 | 8 | 0.1 | Kg |
| 157 | 25.495 | 1.020 | 232 | 1 | 1 | 2 | 8 | 0.1 | Kg |
| 158 | 25.390 | 1.016 | 240 | 1 | 1 | 2 | 8 | 0.1 | Kg |
| 159 | 25.285 | 1.011 | 248 | 1 | 1 | 2 | 8 | 0.1 | Kg |
| 160 | 25.181 | 1.007 | 256 | 1 | 1 | 2 | 8 | 0.1 | Kg |
| 161 | 25.077 | 1.003 | 264 | 1 | 1 | 2 | 8 | 0.1 | Kg |
| 162 | 24.975 | 0.999 | 272 | 1 | 1 | 2 | 8 | 0.1 | Kg |
| 163 | 24.874 | 0.995 | 280 | 1 | 1 | 2 | 8 | 0.1 | Kg |
| 164 | 24.773 | 0.991 | 288 | 1 | 1 | 2 | 8 | 0.1 | Kg |
| 165 | 24.673 | 0.987 | 296 | 1 | 1 | 2 | 8 | 0.1 | Kg |
| 166 | 24.574 | 0.983 | 304 | 1 | 1 | 2 | 8 | 0.1 | Kg |
| 167 | 24.476 | 0.979 | 312 | 1 | 1 | 2 | 8 | 0.1 | Kg |
| 168 | 24.379 | 0.975 | 320 | 1 | 1 | 2 | 8 | 0.1 | Kg |
| 169 | 24.282 | 0.971 | 328 | 1 | 1 | 2 | 8 | 0.1 | Kg |
| 170 | 24.187 | 0.967 | 336 | 1 | 1 | 2 | 8 | 0.1 | Kg |
| 171 | 24.092 | 0.964 | 344 | 1 | 1 | 2 | 8 | 0.1 | Kg |
| 172 | 23.998 | 0.960 | 352 | 1 | 1 | 2 | 8 | 0.1 | Kg |
| 173 | 23.905 | 0.956 | 360 | 1 | 1 | 2 | 8 | 0.1 | Kg |
| 174 | 23.812 | 0.952 | 368 | 1 | 1 | 2 | 8 | 0.1 | Kg |
| 175 | 23.720 | 0.949 | 376 | 1 | 1 | 2 | 8 | 0.1 | Kg |
| 176 | 23.629 | 0.945 | 384 | 1 | 1 | 2 | 8 | 0.1 | Kg |

TABLE 2-continued

| Address | Data (pF) | Sensor/Ref pF Ratio | Display | Sign | Decimal | Icon | Interpolation | Resolution | |
|---|---|---|---|---|---|---|---|---|---|
| 177 | 23.539 | 0.942 | 392 | 1 | 1 | 2 | 8 | 0.1 | Kg |
| 178 | 23.450 | 0.938 | 400 | 1 | 1 | 2 | 8 | 0.1 | Kg |
| 179 | 23.361 | 0.934 | 408 | 1 | 1 | 2 | 8 | 0.1 | Kg |
| 180 | 23.273 | 0.931 | 416 | 1 | 1 | 2 | 8 | 0.1 | Kg |
| 181 | 23.186 | 0.927 | 424 | 1 | 1 | 2 | 8 | 0.1 | Kg |
| 182 | 23.100 | 0.924 | 432 | 1 | 1 | 2 | 8 | 0.1 | Kg |
| 183 | 23.014 | 0.921 | 440 | 1 | 1 | 2 | 8 | 0.1 | Kg |
| 184 | 22.929 | 0.917 | 448 | 1 | 1 | 2 | 8 | 0.1 | Kg |
| 185 | 22.844 | 0.914 | 456 | 1 | 1 | 2 | 8 | 0.1 | Kg |
| 186 | 22.761 | 0.910 | 464 | 1 | 1 | 2 | 8 | 0.1 | Kg |
| 187 | 22.678 | 0.907 | 472 | 1 | 1 | 2 | 8 | 0.1 | Kg |
| 188 | 22.596 | 0.904 | 480 | 1 | 1 | 2 | 8 | 0.1 | Kg |
| 189 | 22.514 | 0.901 | 488 | 1 | 1 | 2 | 8 | 0.1 | Kg |
| 190 | 22.433 | 0.897 | 496 | 1 | 1 | 2 | 8 | 0.1 | Kg |
| 191 | 22.353 | 0.894 | 504 | 1 | 1 | 2 | 8 | 0.1 | Kg |
| 192 | 22.274 | 0.891 | 512 | 1 | 1 | 2 | 8 | 0.1 | Kg |
| 193 | 22.195 | 0.888 | 520 | 1 | 1 | 2 | 8 | 0.1 | Kg |
| 194 | 22.116 | 0.885 | 528 | 1 | 1 | 2 | 8 | 0.1 | Kg |
| 195 | 22.039 | 0.882 | 536 | 1 | 1 | 2 | 8 | 0.1 | Kg |
| 196 | 21.962 | 0.878 | 544 | 1 | 1 | 2 | 8 | 0.1 | Kg |
| 197 | 21.886 | 0.875 | 552 | 1 | 1 | 2 | 8 | 0.1 | Kg |
| 198 | 21.810 | 0.872 | 560 | 1 | 1 | 2 | 8 | 0.1 | Kg |
| 199 | 21.735 | 0.869 | 568 | 1 | 1 | 2 | 8 | 0.1 | Kg |
| 200 | 21.660 | 0.866 | 576 | 1 | 1 | 2 | 8 | 0.1 | Kg |
| 201 | 21.586 | 0.863 | 584 | 1 | 1 | 2 | 8 | 0.1 | Kg |
| 202 | 21.513 | 0.861 | 592 | 1 | 1 | 2 | 8 | 0.1 | Kg |
| 203 | 21.440 | 0.858 | 600 | 1 | 1 | 2 | 8 | 0.1 | Kg |
| 204 | 21.368 | 0.855 | 608 | 1 | 1 | 2 | 8 | 0.1 | Kg |
| 205 | 21.297 | 0.852 | 616 | 1 | 1 | 2 | 8 | 0.1 | Kg |
| 206 | 21.226 | 0.849 | 624 | 1 | 1 | 2 | 8 | 0.1 | Kg |
| 207 | 21.155 | 0.846 | 632 | 1 | 1 | 2 | 8 | 0.1 | Kg |
| 208 | 21.086 | 0.843 | 640 | 1 | 1 | 2 | 8 | 0.1 | Kg |
| 209 | 21.016 | 0.841 | 648 | 1 | 1 | 2 | 8 | 0.1 | Kg |
| 210 | 20.947 | 0.838 | 656 | 1 | 1 | 2 | 8 | 0.1 | Kg |
| 211 | 20.879 | 0.835 | 664 | 1 | 1 | 2 | 8 | 0.1 | Kg |
| 212 | 20.811 | 0.832 | 672 | 1 | 1 | 2 | 8 | 0.1 | Kg |
| 213 | 20.744 | 0.830 | 680 | 1 | 1 | 2 | 8 | 0.1 | Kg |
| 214 | 20.678 | 0.827 | 688 | 1 | 1 | 2 | 8 | 0.1 | Kg |
| 215 | 20.611 | 0.824 | 696 | 1 | 1 | 2 | 8 | 0.1 | Kg |
| 216 | 20.546 | 0.822 | 704 | 1 | 1 | 2 | 8 | 0.1 | Kg |
| 217 | 20.481 | 0.819 | 712 | 1 | 1 | 2 | 8 | 0.1 | Kg |
| 218 | 20.416 | 0.817 | 720 | 1 | 1 | 2 | 8 | 0.1 | Kg |
| 219 | 20.352 | 0.814 | 728 | 1 | 1 | 2 | 8 | 0.1 | Kg |
| 220 | 20.288 | 0.812 | 736 | 1 | 1 | 2 | 8 | 0.1 | Kg |
| 221 | 20.225 | 0.809 | 744 | 1 | 1 | 2 | 8 | 0.1 | Kg |
| 222 | 20.162 | 0.806 | 752 | 1 | 1 | 2 | 8 | 0.1 | Kg |
| 223 | 20.099 | 0.804 | 760 | 1 | 1 | 2 | 8 | 0.1 | Kg |
| 224 | 20.037 | 0.801 | 768 | 1 | 1 | 2 | 8 | 0.1 | Kg |
| 225 | 19.976 | 0.799 | 776 | 1 | 1 | 2 | 8 | 0.1 | Kg |
| 226 | 19.915 | 0.797 | 784 | 1 | 1 | 2 | 8 | 0.1 | Kg |
| 227 | 19.854 | 0.794 | 792 | 1 | 1 | 2 | 8 | 0.1 | Kg |
| 228 | 19.794 | 0.792 | 800 | 1 | 1 | 2 | 8 | 0.1 | Kg |
| 229 | 19.675 | 0.787 | 816 | 1 | 1 | 2 | 8 | 0.1 | Kg |
| 230 | 19.557 | 0.782 | 832 | 1 | 1 | 2 | 8 | 0.2 | Kg |
| 231 | 19.441 | 0.778 | 848 | 1 | 1 | 2 | 8 | 0.2 | Kg |
| 232 | 19.327 | 0.773 | 864 | 1 | 1 | 2 | 8 | 0.2 | Kg |
| 233 | 19.214 | 0.769 | 880 | 1 | 1 | 2 | 8 | 0.2 | Kg |
| 234 | 19.102 | 0.764 | 896 | 1 | 1 | 2 | 8 | 0.2 | Kg |
| 235 | 18.991 | 0.760 | 912 | 1 | 1 | 2 | 8 | 0.2 | Kg |
| 236 | 18.882 | 0.755 | 928 | 1 | 1 | 2 | 8 | 0.2 | Kg |
| 237 | 18.774 | 0.751 | 944 | 1 | 1 | 2 | 8 | 0.2 | Kg |
| 238 | 18.667 | 0.747 | 960 | 1 | 1 | 2 | 8 | 0.2 | Kg |
| 239 | 18.562 | 0.742 | 976 | 1 | 1 | 2 | 8 | 0.2 | Kg |
| 240 | 18.457 | 0.738 | 992 | 1 | 1 | 2 | 8 | 0.2 | Kg |
| 241 | 18.353 | 0.734 | 1008 | 1 | 1 | 2 | 8 | 0.2 | Kg |
| 242 | 18.251 | 0.730 | 1024 | 1 | 1 | 2 | 8 | 0.2 | Kg |
| 243 | 18.149 | 0.726 | 1040 | 1 | 1 | 2 | 8 | 0.2 | Kg |
| 244 | 18.048 | 0.722 | 1056 | 1 | 1 | 2 | 8 | 0.2 | Kg |
| 245 | 17.947 | 0.718 | 1072 | 1 | 1 | 2 | 8 | 0.2 | Kg |
| 246 | 17.848 | 0.714 | 1088 | 1 | 1 | 2 | 8 | 0.2 | Kg |
| 247 | 17.749 | 0.710 | 1104 | 1 | 1 | 2 | 8 | 0.2 | Kg |
| 248 | 17.651 | 0.706 | 1120 | 1 | 1 | 2 | 8 | 0.2 | Kg |
| 249 | 17.408 | 0.696 | 1160 | 1 | 1 | 2 | 8 | 0.2 | Kg |
| 250 | 17.167 | 0.687 | 1200 | 1 | 1 | 2 | 8 | 0.5 | Kg |
| 251 | 16.929 | 0.677 | 1240 | 1 | 1 | 2 | 8 | 0.5 | Kg |
| 252 | 16.691 | 0.668 | 1280 | 1 | 1 | 2 | 8 | 0.5 | Kg |

TABLE 2-continued

| Address | Data (pF) | Sensor/Ref pF Ratio | Display | Sign | Decimal | Icon | Interpolation | Resolution | |
|---|---|---|---|---|---|---|---|---|---|
| 253 | 16.453 | 0.658 | 1320 | 1 | 1 | 2 | 8 | 0.5 | Kg |
| 254 | 16.215 | 0.649 | 1360 | 1 | 1 | 2 | 8 | 0.5 | Kg |
| 255 | 15.975 | 0.639 | 1400 | 1 | 1 | 2 | 8 | 0.5 | Kg |
| 256 | 15.733 | 0.629 | 1440 | 1 | 1 | 2 | 8 | 0.5 | Kg |

The sensor and the method of operation have been described in detail. Various applications are considered to be within the scope of the invention. The unique sensor construction as described provides to the electronic circuit a stable and versatile electrical condition that can be measured. The sensor is easily manufactured for low cost. The power requirements are extremely low, and the device can be powered by miniature solar cells in low levels of ambient light or can be powered by a long life battery continuously for many years. The examples described demonstrate the operation of the present invention, and the invention is not limited by the scope of the examples.

What is claimed is:

1. A variable capacitive sensor, which comprises:
    an outer shell defining a first electrode of the capacitive sensor, the outer shell having an axial bore formed therethrough, and having at least a first open axial end in fluid communication with the axial bore;
    at least a first piston reciprocatingly axially movable within the bore of the outer shell, the at least first piston defining a second electrode of the capacitive sensor;
    at least a first piston shaft, the at least first piston shaft being connected to the at least first piston; and
    at least a first end cap bearing, the at least first end cap bearing being mounted on the outer shell at the at least first open axial end thereof, the at least first end cap bearing having a shaft opening formed through the thickness thereof, the at least first piston shaft being received by and reciprocatingly slidably moveable in the shaft opening.

2. A variable capacitive sensor as defined by claim 1, wherein the outer shell includes an inner wall defining the axial bore; wherein the at least first piston includes an outer radial surface; and wherein the outer radial surface of the at least first piston is spaced from the inner wall of the outer shell by a predetermined distance.

3. A variable capacitive sensor as defined by claim 1, wherein the outer shell is cylindrical in overall shape.

4. A variable capacitive sensor as defined by claim 3, wherein the outer shell includes a first axial portion having a first inner diameter defined by the inner wall, and at least a second axial portion having a second diameter defined by the inner wall and being situated axially adjacent to the first axial portion, the first diameter being different from the second diameter, the at least first piston being reciprocatingly moveable within the axial bore over the first portion and the at least second portion of the outer shell.

5. A variable capacitive sensor as defined by claim 1, wherein the at least first piston includes opposite axial faces, and wherein at least one of the opposite axial faces has formed therein a cutout portion.

6. A variable capacitive sensor as defined by claim 1, wherein the at least first end cap bearing has a fluid vent opening formed through the thickness thereof, the fluid vent opening being in fluid communication with the axial bore of the outer shell.

7. A variable capacitive sensor as defined by claim 1, which further comprises:
    at least one pivot pin disposed on and extending outwardly from the outer shell.

8. A variable capacitive sensor as defined by claim 1, wherein the outer shell includes a second open axial end opposite the at least first open axial end, the second open axial end being in fluid communication with the axial bore; and wherein the sensor further comprises a second end cap bearing, the second end cap bearing being mounted on the outer shell at the second open axial end thereof, the second end cap bearing having a shaft opening formed through the thickness thereof, the at least first piston shaft being received by and reciprocatingly slidably moveable in the shaft opening of the second end cap bearing.

9. A variable capacitive sensor as defined by claim 8, wherein the at least first piston shaft includes a proximal end situated near the at least first end cap bearing and a distal end situated opposite the proximal end and near the second end cap bearing, and wherein the sensor further comprises a bumper situated on the distal end of the at least first piston shaft and engageable with the second end cap bearing.

10. A variable capacitive sensor as defined by claim 9, which further comprises:
    an end cap, the end cap being situated on the proximal end of the at least first piston shaft for connection to a pressure sensitive device.

11. A variable capacitive sensor as defined by claim 1, wherein the at least first end cap bearing includes a portion thereof extending partially axially into the axial bore of the outer shell to define an internal piston stop.

12. A variable differential capacitive sensor, which comprises:
    an outer shell defining a first electrode of the capacitive sensor, the outer shell having an axial bore formed therethrough, and having at least a first open axial end in fluid communication with the axial bore;
    at least a first piston and a second piston operatively linked together, the at least first and second pistons reciprocatingly axially moveable within the axial bore of the outer shell, the at least first piston and second piston respectively defining a second electrode and a third electrode of the capacitive sensor;
    at least a first piston shaft, the at least first piston shaft being operatively linked to the at least first piston and second piston; and
    at least a first end cap bearing, the at least first end cap bearing being mounted on the outer shell at the least first open axial end thereof, the at least first end cap bearing having a shaft opening formed through the thickness thereof, the at least first piston shaft being received by and reciprocatingly slidably moveable in the shaft opening.

13. A variable differential capacitive sensor as defined by claim 12, wherein the outer shell includes an inner wall defining the axial bore; wherein each of the at least first piston and second piston includes an outer radial surface; and wherein the outer radial surface of each of the at least first piston and second piston is spaced from the inner wall of the outer shell by a predetermined distance.

14. A variable differential capacitive sensor as defined by claim 12, wherein the outer shell is cylindrical in overall shape.

15. A variable differential capacitive sensor as defined by claim 14, wherein the outer shell includes a first axial portion having a first inner diameter defined by the inner wall, and at least a second axial portion having a second diameter defined by the inner wall and being situated axially adjacent to the first axial portion, the first diameter being different from the second diameter, the at least first piston and second piston being reciprocatingly moveable within the axial bore over the first portion and the at least second portion of the outer shell.

16. A variable differential capacitive sensor as defined by claim 12, wherein the first piston includes an axial face and the second piston includes an axial face, the axial face of the first piston being disposed in an opposite direction to that of the axial face of the second piston, and wherein the axial face of the at least one of the first piston and the second piston has formed therein a cutout portion.

17. A variable differential capacitive sensor as defined by claim 12, wherein the at least first end cap bearing has a fluid vent opening formed through the thickness thereof, the fluid vent opening being in fluid communication with the axial bore of the outer shell.

18. A variable differential capacitive sensor as defined by claim 12, which further comprises:
at least one pivot pin disposed on and extending outwardly from the outer shell.

19. A variable differential capacitive sensor as defined by claim 12, wherein the outer shell includes a second open axial end opposite the at least first open axial end, the second open axial end being in fluid communication with the axial bore; and wherein the sensor further comprises a second end cap bearing, the second end cap bearing being mounted on the outer shell at the second open axial end thereof, the second end cap bearing having a shaft opening formed through the thickness thereof, and further comprising a second piston shaft, the second piston shaft being received by and reciprocatingly slidably moveable in the shaft opening of the second end cap bearing, the at least first piston shaft being connected to the at least first piston, and the second piston shaft being connected to the second piston.

20. A variable differential capacitive sensor as defined by claim 19, which further comprises:
a bumper situated on the second piston shaft and engageable with the second end cap bearing.

21. A variable differential capacitive sensor as defined by claim 20, which further comprises:
an end cap, the end cap being situated on the at least first piston shaft for connection to a pressure sensitive device.

22. A variable differential capacitor sensor as defined by claim 12, wherein the at least first end cap bearing includes a portion thereof extending partially axially into the axial bore of the outer shell to define an internal piston stop.

23. A pressure sensor, which comprises:
a variable capacitive sensor as defined by claim 1; and
a pressure sensitive Bourdon tube, the Bourdon tube having an expandable and contractable portion which moves in response to pressure sensed by the Bourdon tube, the expandable and contractable portion being operatively linked to the at least first piston shaft to move the at least first piston shaft and the at least first piston connected thereto within the axial bore in response to movement of the expandable and contractable portion of the Bourdon tube.

24. A pressure sensor as defined by claim 23, wherein the variable capacitive sensor further includes at least one pivot pin, the at least one pivot pin being disposed on and extending outwardly from the outer shell; and wherein the pressure sensor further comprises as least one pivot bearing, the at least one pivot bearing being mounted to the Bourdon tube, the at least one pivot bearing having a opening formed therein for pivotably receiving the at least one pivot pin of the capacitive sensor to allow the capacitive sensor to pivot thereon with movement of the expandable and contractable portion of the Bourdon tube.

25. A pressure sensor, which comprises:
a variable differential capacitive sensor as defined by claim 12; and
a pressure sensitive Bourdon tube, the Bourdon tube having an expandable and contractable portion which moves in response to pressure sensed by the Bourdon tube, the expandable and contractable portion being operatively linked to the at least first piston shaft to move the at least first piston shaft and the at least first piston and second piston operatively linked thereto within the axial bore in response to movement of the expandable and contractable portion of the Bourdon tube.

26. A pressure sensor as defined by claim 25, wherein the variable differential capacitive sensor further includes at least one pivot pin, the at least one pivot pin being disposed on and extending outwardly from the outer shell; and wherein the pressure sensor further comprises at least one pivot bearing, the at least one pivot bearing mounted to the Bourdon tube, the at least one pivot bearing having an opening formed therein for pivotally receiving the at least one pivot pin of the capacitive sensor to allow the capacitive sensor to pivot thereon with movement of the expandable and contractable portion of the Bourdon tube.

27. A variable capacitive pressure sensor, which comprises:
a pressure sensitive Bourdon tube, the Bourdon tube having an expandable and contractable portion which moves in response to pressure sensed by the Bourdon tube;
a first plate mounted directly on the unconstrained expandable and contractable portion of the Bourdon tube, the first plate defining a first electrode of the capacitive pressure sensor and being moveable with the unconstrained expandable and contractable portion of the Bourdon tube; and
a second plate, the second plate being fixedly situated in proximity to the first plate and defining a second electrode of the capacitive pressure sensor, the first and second plates defining a spacing therebetween, the spacing being changeable with movement of the unconstrained expandable and contractable portion of the Bourdon tube and the first plate mounted thereon.

28. A variable capacitive pressure sensor as defined by claim 27, which further comprises:
a first mounting sector, the first mounting sector being coupled to the Bourdon tube, the second plate being mounted on the first mounting sector.

29. A variable capacitive pressure sensor as defined by claim 28, wherein the first mounting sector includes a plate-like member residing in a plane, and wherein the second plate extends perpendicularly from the first mounting sector in one of underlying and overlying relationship to the first plate.

30. A variable capacitive pressure sensor as defined by claim 28, which further comprises:
a first insulator, the first insulator being mounted to the Bourdon tube and extending in an axially direction thereto, the first mounting sector being mounted on the first insulator.

31. A variable differential capacitive pressure sensor, which comprises:
a pressure sensitive Bourdon tube, the Bourdon tube having an expandable and contractable portion which moves in response to pressure sensed by the Bourdon tube, the expandable and contractable portion having an upper surface and a lower surface situated opposite the upper surface;
a first plate mounted on the lower surface of the expandable and contractable portion of the Bourdon tube, the first plate at least partially defining a first electrode of the capacitive pressure sensor and being moveable with the expandable and contractable portion of the Bourdon tube;
a second plate, the second plate being fixedly situated in proximity to the first plate, the first and second plates defining a first spacing therebetween, the first spacing being changeable with movement of the expandable and contractable portion of the Bourdon tube and the first plate mounted thereon, the second plate defining a second electrode of the capacitive pressure sensor;
a third plate, the third plate being mounted on the upper surface of the expandable and contractable portion of the Bourdon tube, the third plate at least partially defining with the first plate the first electrode of the capacitive pressure sensor and being moveable with the expandable and contractable portion of the Bourdon tube; and
a fourth plate, the fourth plate being fixedly situated in proximity to the third plate, the third and fourth plates defining a second spacing therebetween, the second spacing being changeable with movement of the expandable and contractable portion of the Bourdon tube and the third plate mounted thereon, the fourth plate defining a third electrode of the capacitive pressure sensor.

32. A variable differential capacitive pressure sensor as defined by claim 31, which further comprises:
a first mounting sector, the first mounting sector being coupled to the Bourdon tube, the second plate being mounted on the first mounting sector; and
a second mounting sector, the second mounting sector being coupled to the Bourdon tube, the fourth plate being mounted on the second mounting sector.

33. A variable differential capacitive pressure sensor as defined by claim 32, wherein the first mounting sector includes a first plate-like member residing in a first plane; wherein the second plate extends perpendicularly from the first mounting sector in underlying relationship to the first plate; wherein the second mounting sector includes a second plate-like member residing in a second plane which is disposed parallelly to the first plane; and wherein the fourth plate extends perpendicularly from the second mounting sector in overlying relationship to the third plate.

34. A variable differential capacitive pressure sensor as defined by claim 32, which further comprises:
a first insulator, the first insulator being mounted to the Bourdon tube and extending in an axially direction thereto, the first mounting sector being mounted on the first insulator; and
a second insulator, the second insulator being mounted to the Bourdon tube and extending axially direction thereto, the second mounting sector being mounted on the second insulator.

35. A variable capacitive pressure sensor, which comprises:
a pressure sensitive Bourdon tube, the Bourdon tube having an unconstrained expandable and contractable portion which moves in response to pressure sensed by the Bourdon tube, the Bourdon tube having a first surface forming a portion of the unconstrained expandable and contractable portion of the Bourdon tube and which defines a first electrode of the capacitive pressure sensor; and
a first plate, the first plate being fixedly situated in proximity to the first surface and defining a second electrode of the capacitive pressure sensor, the first plate and the first surface of the Bourdon tube defining a spacing therebetween, the spacing being changeable with movement of the unconstrained expandable and contractable portion of the Bourdon tube and the first surface situated thereon.

36. A variable differential capacitive pressure sensor, which comprises:
a pressure sensitive Bourdon tube, the Bourdon tube having an unconstrained expandable and contractable portion which moves in response to pressure sensed by the Bourdon tube, the unconstrained expandable and contractable portion having an upper surface and a lower surface situated opposite the upper surface, the upper and lower surfaces forming portion of the Bordon tube and defining a first eletrode of the capacitive sensor;
a first plate, the first plate being fixedly situated in proximity to the lower surface of the Bourdon tube, the first plate and the lower surface of the Bourdon tube defining a first spacing therebetween, the first spacing being changeable with movement of the unconstrained expandable and contractable portion of the Bourdon tube and the lower surface situated thereon, the first plate defining a second electrode of the capacitive sensor; and
a second plate, the second plate being fixedly situated in proximity to the upper surface of the Bourdon tube, the second plate and the upper surface of the Bourdon tube defining a second spacing therebetween, the second spacing being changeable with movement of the unconstrained expandable and contractable portion of the Bourdon tube and the upper surface situated thereon, the second plate defining a third electrode of the capacitive sensor.

37. A digital pressure gauge, which comprises:
a pressure sensor as defined by claim 23; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

38. A digital pressure gauge as defined by claim 37, wherein the electronic circuit further includes a source of solar power, the source of solar power providing electrical power to the microprocessor and display.

39. A digital pressure gauge, which comprises:
a pressure sensor as defined by claim 25; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

40. A digital pressure gauge as defined by claim 39, wherein the electronic circuit further includes a source of solar power, the source of solar power providing electrical power to the microprocessor and display.

41. A digital pressure gauge, which comprises:
a variable capacitive pressure sensor as defined by claim 27; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

42. A digital pressure gauge as defined by claim 41, wherein the electronic circuit further includes a source of solar power, the source of solar power providing electrical power to the microprocessor and display.

43. A digital pressure gauge which comprises:
a variable differential capacitive pressure sensor as defined by claim 31; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

44. A digital pressure gauge as defined by claim 43, wherein the electronic circuit further includes a source of solar power, the source of solar power providing electrical power to the microprocessor and display.

45. A digital pressure gauge, which comprises:
a variable capacitive pressure sensor as defined by claim 35; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

46. A digital pressure gauge as defined by claim 45, wherein the electronic circuit further includes a source of solar power, the source of solar power providing electrical power to the microprocessor and display.

47. A digital pressure gauge, which comprises:
a variable differential capacitive pressure sensor as defined by claim 36; and
an electronic circuit, the pressure sensor providing a value of capacitance in response to pressure sensed by the pressure sensor, the electronic circuit having a microprocessor and a display electrically connected to the microprocessor, the microprocessor causing the display to indicate the pressure sensed by the pressure sensor in response to the value of capacitance provided by the pressure sensor.

48. A digital pressure gauge as defined by claim 47, wherein the electronic circuit further includes a source of solar power, the source of solar power providing electrical power to the microprocessor and display.

* * * * *